United States Patent
Yamasaki et al.

(10) Patent No.: US 7,817,355 B2
(45) Date of Patent: Oct. 19, 2010

(54) AFOCAL LENS, OPTICAL HEAD, OPTICAL DISK APPARATUS AND OPTICAL INFORMATION EQUIPMENT

(75) Inventors: Fumitomo Yamasaki, Nara (JP); Yoshiaki Komma, Osaka (JP); Kanji Wakabayashi, Kyoto (JP); Toshiyasu Tanaka, Osaka (JP); Katsuhiko Hayashi, Osaka (JP)

(73) Assignee: Panasonic Corporation, Osaka (JP)

( * ) Notice: Subject to any disclaimer, the term of this patent is extended or adjusted under 35 U.S.C. 154(b) by 488 days.

(21) Appl. No.: 11/966,109

(22) Filed: Dec. 28, 2007

(65) Prior Publication Data
US 2008/0165420 A1 Jul. 10, 2008

Related U.S. Application Data

(60) Provisional application No. 60/877,604, filed on Dec. 29, 2006.

(51) Int. Cl.
*G02B 13/00* (2006.01)
*G11B 7/00* (2006.01)

(52) U.S. Cl. .................. 359/744; 369/44.23; 369/44.32; 369/112.01

(58) Field of Classification Search ................. 359/642, 359/744; 369/44.23, 44.32, 112.01
See application file for complete search history.

(56) References Cited

U.S. PATENT DOCUMENTS

| | | | | |
|---|---|---|---|---|
| 7,031,076 B2 * | 4/2006 | Kimura et al. | ............... | 359/719 |
| 7,085,203 B2 * | 8/2006 | Shiono et al. | ............. | 369/44.32 |
| 7,133,332 B2 * | 11/2006 | Kimura | ................... | 369/44.32 |

FOREIGN PATENT DOCUMENTS

| JP | 7-98431 | 4/1995 |
|---|---|---|
| JP | 10-10308 | 1/1998 |

* cited by examiner

*Primary Examiner*—Scott J Sugarman
(74) *Attorney, Agent, or Firm*—Wenderoth, Lind & Ponack, LLP

(57) ABSTRACT

The present invention provides an afocal lens for an optical head that can ensure WD while satisfying NA, the optical head, an optical disk apparatus, a computer, an optical disk player, and an optical disk recorder. Using a blue-violet laser beam source with wavelength of about 400 nm, and in an optical head compatible to optical disks having different protective substrate thickness, an afocal lens that expands a diameter of light flux of light from a collimating lens and emits the light as substantially parallel light to an objective lens is provided between the collimating lens and the objective lens. The configuration makes it possible to ensure WD while satisfying NA.

24 Claims, 17 Drawing Sheets

106b  106a  106b

AFOCAL LENS, OPTICAL HEAD, OPTICAL DISK APPARATUS AND OPTICAL INFORMATION EQUIPMENT

CROSS-REFERENCE TO RELATED APPLICATIONS

This application claims priority from and the benefit of U.S. Provisional Patent Application Ser. No. 60/877,604, filed Dec. 29, 2006, the disclosure of which is incorporated by reference herein in its entirety.

BACKGROUND OF THE INVENTION

1. Field of the Invention

The present invention relates to an afocal lens, more specifically, relates to an afocal lens for an optical head that optically records and reproduces information onto different types of information recording media such as an optical disk, etc., the optical head having the afocal lens, an optical disk apparatus provided with the optical head, and optical information equipment provided with the optical disk apparatus.

2. Description of the Related Art

In recent years, as blue-violet semiconductor lasers have come into practical use, a Blu-ray Disk (hereinafter referred to as BD) having the same size as a CD (Compact Disk) or a DVD (Digital Versatile Disk) and being an optical information recording medium (hereinafter referred to as an optical disk) of high density and high capacity has also been put into practical application. The BD is an optical disk with a protective substrate being about 0.1 mm thickness that performs recording or reproduction by using a blue-violet laser source having wavelength of about 400 nm and an objective lens with the numerical aperture (NA) increased to 0.85.

On the other hand, a HD DVD with a protective substrate being about 0.6 mm thickness that also uses a blue-violet laser source having wavelength of about 400 nm and an objective lens with the numerical aperture of 0.65 is also in practical use.

Hence, there is proposed a compatible optical head that uses one objective lens to focus laser beam onto information recording surfaces of optical disks having different thickness of the respective protective substrates, thereby recording and reproducing information.

Each of Japanese unexamined patent publication No. 7-98431 and Japanese unexamined patent publication No. 10-10308 describes an optical head provided with a light-condensing optics system that is capable of focusing laser beam to the diffraction limit, onto optical disks having the protective substrates with different thicknesses.

FIG. 18 shows an example of configuration of a conventional optical head described in the Japanese unexamined patent publication No. 7-98431. In FIG. 18, an optical head 20 includes a light source emitting red laser beam 1, a beamsplitter 3, a collimating lens 4, a hologram lens 5, an objective lens 6, a detection lens 8, and a light receiving element 9. In addition, reference symbol 70 designates the DVD that is an optical disk with a protective substrate being 0.6 mm thickness.

An operation of the optical head 20 that records and reproduces information onto/from the DVD 70 is described. A red laser beam emitted from the light source 1 transmits through the beam splitter 3, is transformed into substantially parallel light by the collimating lens 4, transmits through the hologram lens 5, and is focused as a light spot on an information recording surface of the DVD 70 through the protective substrate. A returning red laser beam that is reflected at the information recording surface of the DVD 70 transmits through the objective lens 6, the hologram lens 5, and the collimating lens 4 on the same light path as the advancing path. Then, the returning red laser beam is reflected by the beam splitter 3, given predetermined astigmatism by the detection lens 8, guided by the light-receiving element 9. The red laser beam then generates an information signal and a servo signal.

Next, with reference to FIG. 19, an operation of the optical head 20 is described in the case where recording or reproduction is performed on a CD 80 that is an optical disk having the protective substrate being 1.2 mm thickness. The red laser light emitted from the light source 1 transmits through the beam splitter 3, and is transformed into substantially parallel light by the collimating lens 4. Then, after being diffracted by the hologram lens 5, the red laser beam is focused as a light spot on an information recording surface of the CD 80 by the objective lens 6 through the protective substrate. A returning red laser beam that is reflected at the information recording surface of the CD 80 transmits through the objective lens 6, the hologram 5, and the collimating lens 4 on the same light path as the advancing path. Then, the returning red laser beam is reflected by the beam splitter 3, given predetermined astigmatism by the detection lens 8, guided by the light-receiving element 9. The returning red laser beam then generates an information signal and a servo signal.

Generation of a focus error signal for recording or reproducing the DVD 70 and CD 80 is capable of using a so-called astigmatism method, etc. that detects a light-condensing spot to which the detection lens 8 gives astigmatism, by means of a four-divided light-receiving pattern in the light-receiving element 9. In addition, a tracking error signal is capable of using a so-called 3-beam method or differential push-pull method (DPP method), etc., that uses main beam and sub-beams generated by a diffraction grating (not shown).

In the following, a function of the hologram lens 5 and the objective lens 6 will be described with reference to FIG. 20, FIG. 21A and FIG. 21B.

As light is focused as a minute light spot to the DVD 70 and CD 80, the hologram lens 5 is provided with a grating pattern 5a as shown in FIG. 20. A diffraction efficiency of a plus-first-order diffracted light of the hologram lens 5 is less than 100%. The hologram lens 5 is designed so that transmitted light (hereinafter in this application, transmitted light that is not diffracted may also be represented as a zero-order diffracted light, and thus the transmitted light is treated as one diffracted light) has also sufficient intensity. In addition, the hologram lens 5 can increase the sum of light quantity of the zero-order diffracted light and the plus-first-order diffracted light through blazing thereby improving the light utilization efficiency.

The objective lens 6 has the numerical aperture (NA) of 0.6, and, as shown in FIG. 21A, is designed to form a light-condensing spot of the diffraction limit on the DVD 70 with the protective substrate being 0.6 mm thickness, when laser beam that transmits through the hologram lens 5 without being diffracted (in other words, the zero-order diffracted light) enters.

On the one hand, as shown in FIG. 21B, the plus-first-order diffracted light that was diffracted at the hologram lens 5 is focused on the CD 80 by the objective lens 6. Herein, the plus-first-order diffracted light is subjected to aberration correction so as to form a light-condensing spot of the diffraction limit on the CD 80 with the protective substrate being 1.2 mm thickness.

Thus, a combination of the hologram lens 5 that diffracts part of incident light with the objective lens 6 can enable implementation of a bifocal lens capable of forming a light-condensing spot that will be focused to the diffraction limit on each of optical disks having different substrate thickness.

In addition, since the hologram lens 5 has the lens action, positions of two focal points in a light axis direction differ. Thus, while information is being recorded or reproduced using a light spot formed on one focal point, the other light spot formed on the other focal point widely expands, and does not affect recording or reproduction of information.

Use of such the optical head 20 can enable recording or reproduction of information onto optical disks of different kinds, respectively, by using one objective lens.

SUMMARY OF THE INVENTION

The above-described Japanese unexamined patent publication No. 7-98431 and Japanese unexamined patent publication No. 10-10308 describe the configuration of an optical head that is compatible to optical disks of many different types, such as the DVDs and CDs, with different thickness of protective substrates, with the bifocal lens using hologram.

As can be clearly seen through a comparison of FIG. 21A and FIG. 21B, in the optical head that can be shared by optical disks with protective substrates of different thickness, different thickness of the protective substrates, etc. makes a difference in a working distance (WD) that is a distance between the objective lens and the optical disk, and the WD is decreased for any optical disk having a thick protective substrate. The phenomenon is similarly observed in an optical head that uses a blue-violet laser source with wavelength of about 400 nm and that records or reproduces on an optical disk with a plurality of information recording surfaces, for instance. On the other hand, an angle of light to be emitted from an objective lens, in other words, NA (numerical aperture) of the objective lens, has been specified. Thus, it is necessary to ensure the WD, while satisfying the NA. The above-described Japanese unexamined patent publication No. 7-98431 and Japanese unexamined patent publication No. 10-10308, however, do not mention any idea of ensuring the WD while satisfying such the NA.

The present invention aims to provide an afocal lens, in particular, the afocal lens for an optical head capable of ensuring the WD while satisfying the NA, on optical heads that can be shared onto optical disks with protective substrates having different thickness, an optical disk apparatus provided with the optical head, and optical information equipment provided with the optical disk apparatus.

In order to achieve above-described object, the present invention has a following configuration.

That is, an afocal lens according to a first aspect of the present invention is provided in an optical head having a collimating lens and an objective lens, the optical head focusing laser beam emitted from a light source onto information recording surfaces of different kinds of information recording media having different protective substance thickness by different numerical aperture, the afocal lens for the optical head configured to be provided between the collimating lens and the objective lens, expand a diameter of light flux of the laser beam entered from a side of the collimating lens, and emit the entered laser beam as substantially parallel light to the objective lens.

The optical head may be designed to have a light source for emitting laser beam with wavelength of λ1, and the objective lens focuses diffracted light having a plurality of orders being different to each other by the laser beam with wavelength of λ1 on the information recording surfaces on a basis of a kind of the information recording medium.

The optical head may be designed to have a light source that emits laser beam with different wavelengths on a basis of a kind of the information recording medium.

The objective lens may be designed to focus diffracted light having a plurality of orders being different to each other onto the information recording surfaces on a basis of a kind of the information recording medium.

The afocal lens for the optical head may comprise a wavelength variation correction part configured to correct any aberration generated by wavelength variations in the laser beam, on one of a first surface on the side of the collimating lens and a second surface on the side of the objective lens of the afocal lens.

In the afocal lens for the optical head, the wavelength variation correction part may be formed on the first surface.

In the afocal lens for the optical head, the wavelength variation correction part may be formed on the second surface.

The afocal lens for the optical head may further comprise a diffraction part configured to generate diffracted light having n order and m order (n and m are integers being different to each other) and a wavelength variation correction part configured to correct any aberration caused by wavelength variations in the laser beam, on one of a first surface on the side of the collimating lens and a second surface on the side of the objective lens of the afocal lens.

The afocal lens for the optical head may further comprise one of a diffraction part configured to generate diffracted light having n order and m order (n and m are integers being different to each other) and a wavelength variation correction part configured to correct any aberration caused by wavelength variations in the laser beam on a first surface, and the other of the diffraction part and the wavelength variation correction part on a second surface, wherein the first surface is a surface located at a side of the collimating lens of the afocal lens and the second surface is a surface located at a side of the objective lens of the afocal lens.

In the afocal lens for the optical head, the wavelength variation correction part may be formed on the first surface and the diffraction part may be formed on the second surface.

In the afocal lens for the optical head, an expansion ratio of laser beam in the afocal lens may be a scale factor satisfying:

$$D1 \times 1.1 \leq D2 \leq D1 \times 1.5$$

where D1 is a diameter of light flux of laser beam entering into a surface on the side of the collimating lens of the afocal lens, and D2 is a diameter of light flux of laser beam to be emitted from a surface on the side of the objective lens of the afocal lens.

In the afocal lens for the optical head, the afocal lens may be made of resin material and may have edge surfaces that are surfaces substantially perpendicular to the light axis of the laser beam on a side of the collimating lens and a side of the objective lens, and an effective surface faced into the objective lens of the afocal lens protrudes with respect to the edge surface on the side of the objective lens.

An optical head according to a second aspect of the present invention comprises a light source, a collimating lens, and an objective lens;

the optical head focusing laser beam emitted from the light source onto information recording surfaces of different kinds of information recording media having different protective substrate thickness by different numerical aperture, the optical head further comprising a afocal lens configured to be provided between the collimating lens and the objective lens, expand a diameter of light flux of the laser beam entered from the side of the collimating lens, and emit the entered laser beam as substantially parallel light to the objective lens.

In the optical head according to the second aspect, the light source may emit the laser beam with wavelength of λ1, and the objective lens may focus diffracted light having a plurality of orders being different to each other in the laser beam with wavelength of λ1 on the information recording surfaces on a basis of a kind of the information recording medium.

In the optical head according to the second aspect, the light source may emit laser beam with different wavelengths on a basis of a kind of the information recording medium.

In the optical head according to the second aspect, the objective lens may focus diffracted light having a plurality of orders being different to each other on the information recording surfaces on the basis of the kind of the information recording medium.

In the optical head according to the second aspect, the objective lens may comprise a diffraction part configured to generate diffracted light having n order and m order (n and m are integers being different to each other), and the afocal lens may comprise a wavelength variation correction part configured to correct any aberration caused by wavelength variations in the laser beam, on one of a first surface on a side of the collimating lens and a second surface on a side of the objective lens of the afocal lens.

In the optical head according to the second aspect, the wavelength variation correction part may be provided on the first surface.

In the optical head according to the second aspect, the afocal lens may comprise a diffraction part configured to generate diffracted light having n order and m order (n and m are integers being different to each other) and a wavelength variation correction part configured to correct any aberration caused by wavelength variations in the laser beam, on one of a first surface on a side of the collimating lens and a second surface on a side of the objective lens of the afocal lens.

In the optical head according to the second aspect, the afocal lens may comprise one of a diffraction part configured to generate diffracted light having n order and m order (n and m are integers being different to each other) and a wavelength variation correction part configured to correct any aberration caused by wavelength variations in the laser beam on a first surface on a side of the collimating lens of the afocal lens, and may comprise the other of the diffraction part and the wavelength variation correction part on a second surface of a side of the objective lens of the afocal lens.

In the optical head according to the second aspect, the diffraction part may be provided on the second surface and the wavelength variation correction part may be provided on the first surface.

In the optical head according to the second aspect, an expansion ratio of the laser beam in the afocal lens may be a scale factor satisfying:

$$D1 \times 1.1 \leq D2 \leq D1 \times 1.5$$

where D1 is a diameter of light flux of the laser beam entering into a surface on a side of the collimating lens of the afocal lens, and D2 is a diameter of light flux of the laser beam to be emitted from a surface on a side of the objective lens of the afocal lens.

An optical disk apparatus according to a third aspect of the present invention comprises the optical head of the first aspect, a motor configured to rotate and drive information recording medium, and a control unit configured to control the optical head and the motor.

In addition, a computer according to a fourth aspect of the present invention includes the optical disk apparatus according to the third aspect; an input unit for inputting information; a computing unit for carrying out an operation based on at least one of information reproduced from the optical disk and information inputted from the input means; and an output unit for outputting at least one of the information reproduced from the optical disk, the information inputted from the input means, and result of the operation carried out by the computing means.

An optical disk player according to a fifth aspect of the present invention includes the optical disk apparatus according to the third aspect, and a decoder for converting information signal to be obtained from the optical disk apparatus into image information.

An optical disk recorder according to a sixth aspect of the present invention includes the optical disk apparatus according to the third aspect, and an encoder for converting the image information into an information signal to be recorded by the optical disk apparatus.

An afocal lens according to a seventh aspect of the present invention is a meniscus-shaped, and comprises a concave refracting surface, a convex refracting surface opposed to the concave refracting surface, and diffraction lens formed on the concave refracting surface or the convex refracting surface, the afocal lens configured to form the diffraction lens on the refracting surface having the lens power opposite to the concave or convex lens power in the diffraction lens.

An afocal lens according to an eighth aspect of the present invention is the afocal lens to be arranged between an objective lens having the numerical aperture of 0.85 or higher and a collimating lens. The magnifying power of laser beam in the afocal lens is a scaling factor that satisfies $D1 \times 1.1 \leq D2 \leq D1 \times 1.5$, wherein D1 is a diameter of light flux of laser beam entering from a surface on the side of the collimating lens and D2 is a diameter of light flux of laser beam to be emitted from the side of the objective lens.

According to the afocal lens of the first aspect, the diameter of light flux of laser beam entering the objective lens can be increased, when compared with the case in which laser beam enters from the collimating lens to the objective lens. Thus, the effective light flux diameter on the incident side of the objective lens increases, thereby extending the focal length of the objective lens. Therefore, it is possible to ensure the WD while satisfying the NA of the objective lens, thereby being able to set the WD, which is a distance between the objective lens and the optical disk, to a given value. In addition, provision of the afocal lens allows the light flux diameter of laser beam on the incident side of the afocal lens to be reduced, thereby enabling reducing the size of the entire optics system compared with a conventional one.

In addition, use of the afocal lens makes the light flux of laser beam entering the objective lens substantially parallel light, and thus makes abaxial aberrations to be generated at the objective lens become very small when the objective lens and the afocal lens are misaligned. Thus, tolerance of displacement in the case where the afocal lens is mounted onto an objective lens actuator increases, thus enabling mounting with substantially no adjustment.

In addition, provision of a diffraction part and a wavelength variation correction part on either one of a surface on the side of the collimating lens and a surface on the side of the collimating lens of the afocal lens allows treatment of a die for fabricating the afocal lens only on one side, thereby being able to facilitate fabrication of the die and thus the afocal lens.

Furthermore, when the diffraction part and wavelength variation correction part are provided on the surface on the side of the objective lens of the afocal lens, a wide diffraction pitch of the diffraction part can be taken because the surface on the side of the objective lens is convex and has a larger effective light flux diameter than that of a concave surface on the side of the collimating lens. This can facilitate fabrication of the afocal lens.

In addition, a shape of a diffraction mechanism in the die for fabricating the afocal lens can be simplified, by providing one of the diffraction part and the wavelength variation correction part on one of the surface on the side of the collimating lens and that on the side of the objective lens of the afocal lens, and providing the other of the diffraction part and wavelength variation correction part on the other of the surface on the side of the collimating lens and that on the surface of the objective lens.

The magnifying power that is greater than the conventional one can be obtained by setting the magnifying power of laser beam in the afocal lens to 1.1 to 1.5 times. Also, by setting the upper limit to 1.5 times, a decrease in the light quantity of laser beam entering the afocal lens can be prevented, even when the largest shift is made in a tracking operation of an objective lens configured integrally with the afocal lens.

Making the surface on the side of the objective side of the afocal lens convex to an edge surface can facilitate molding of the afocal lens.

In addition, according to the optical head of the second aspect, the optical disk apparatus of the third aspect, the computer of the fourth aspect, the optical disk player of the fifth aspect, and the optical disk recorder of the sixth aspect, provision of the above-described afocal lens enables recording and reproduction of information both on a first information recording medium on whose information recording surface n-order diffracted light is focused and a second information recording medium on whose information recording surface m-order diffracted light is focused, in respective n-order and m-order (n, m being different integers) diffracted light generated by laser beam.

In addition, according to the afocal lens of the seventh aspect, formation of the diffraction lens on a refracting surface of an afocal lens having the lens power opposite to concave or convex lens power in the diffraction lens facilitates fabrication of a die for molding the afocal lens, and, consequently, the afocal lens can be molded easily.

In addition, according to the afocal lens of the eighth aspect, a diameter of light flux entering an objective lens can be expanded. Thus, even when an objective lens having the high NA of 0.85 or higher is used, the specified WD (working distance) can be achieved without increasing the size of the optics system.

DETAILED DESCRIPTION OF THE PREFERRED EMBODIMENTS

In the following, referring to drawings, embodiments of the present invention, namely, an afocal lens for an optical head, an optical head, an optical disk apparatus, a computer, an optical disk player, and an optical disk recorder will be described. The optical head is provided with the afocal lens for the optical head, the optical disk apparatus is an apparatus provided with the optical head, and the computer, the optical disk player, and the optical disk recorder are provided with the optical disk apparatus. The computer, the optical disk player and the optical disk recorder are herein collectively referred to as optical information equipments.

In addition, same or similar components are assigned with same symbols throughout the drawings.

First Embodiment

Figure 1:
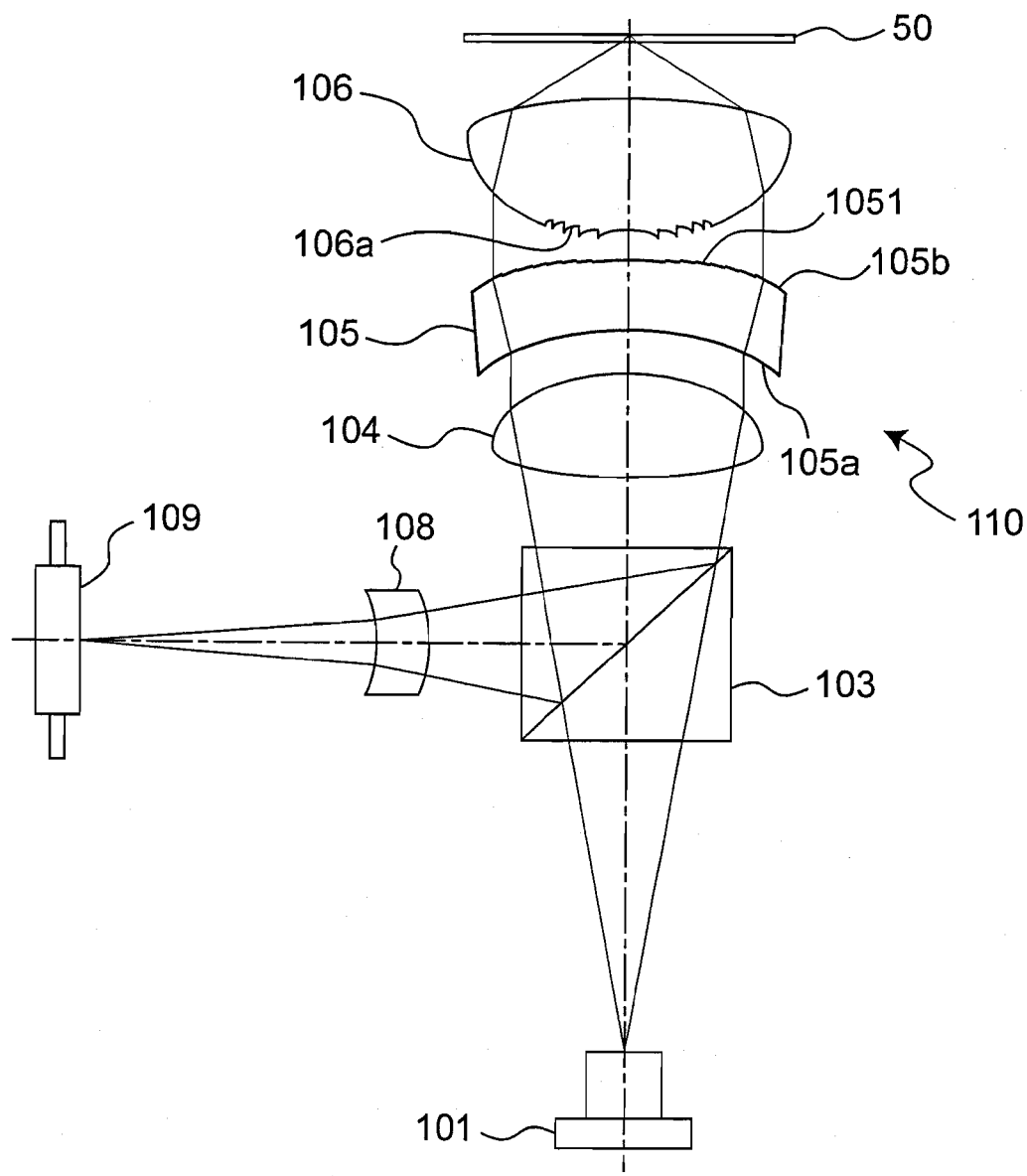
FIG. 1 is a view showing the configuration in one example of an optical head in an embodiment of the present invention, which shows the case in which the optical head acts on a first optical disk.
Figure 2:
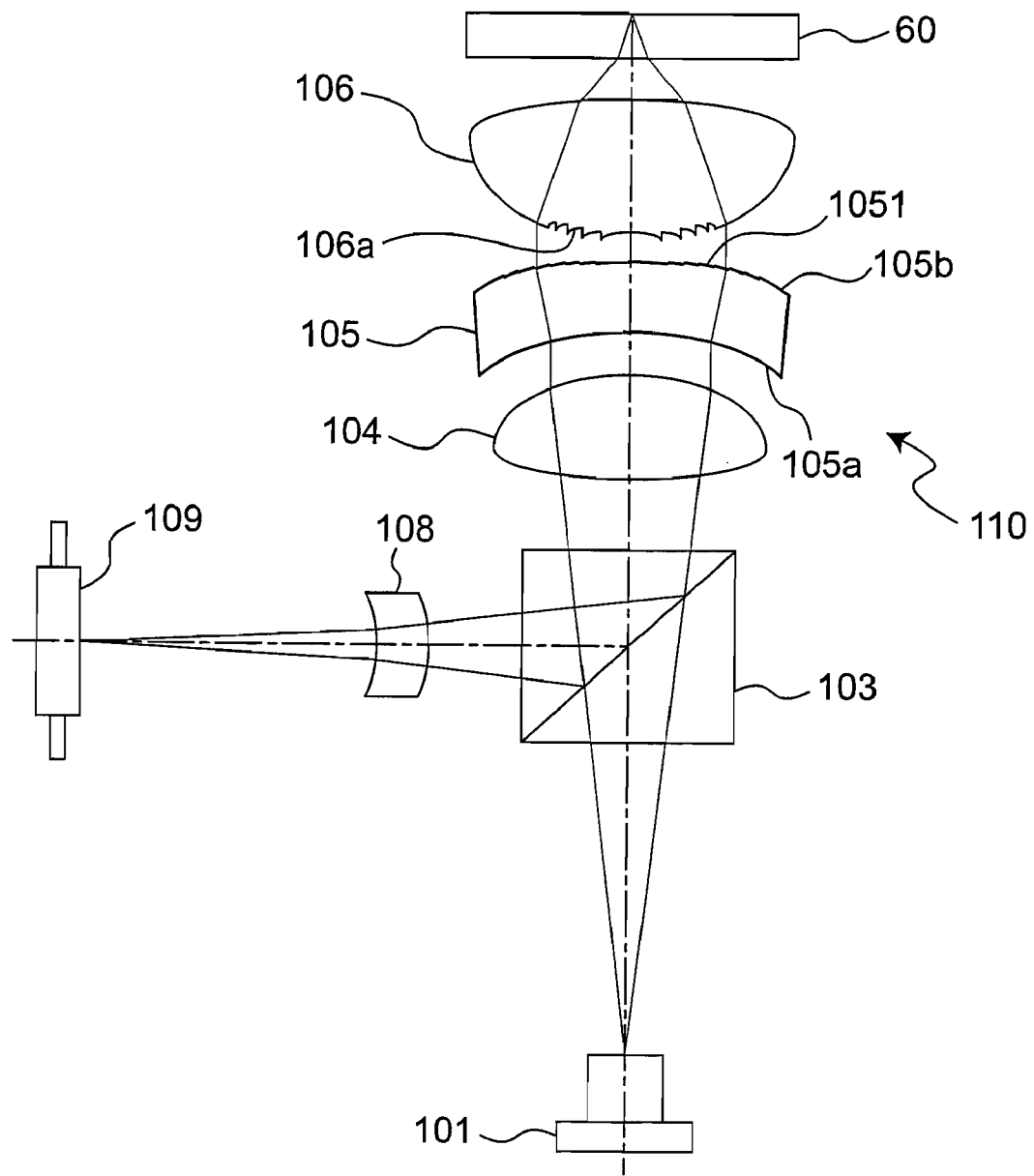
FIG. 2 is a view showing the case in which the optical head as shown in FIG. 1 acts on a second optical disk.

FIG. 1 and FIG. 2 are views showing a schematic configuration of an optical head in one embodiment of the present invention.

In FIG. 1 and FIG. 2, an optical head 110 includes a light source 101 for emitting a blue-violet laser beam, a beam splitter 103, a collimating lens 104, an afocal lens 105 functioning as a light flux spreading lens to be detailed later, an objective lens 106, to be detailed later, with a hologram corresponding to a diffraction part, integrally molded with the lens, a detection lens 108, and a light-receiving element 109 that receives a laser beam. In addition, reference symbol 50 designates a first optical disk corresponding to one example of a first information recording medium and having a protective substrate thickness being any value from 0.065 mm to 0.110 mm, and reference symbol 60 designates a second optical disk corresponding to one example of a second information recording medium and having a protective substrate thickness being any value from 0.570 mm to 0.630 mm.

With FIG. 1, an operation of the optical head 110 that records or reproduces information onto the first optical disk 50 is described. The blue-violet laser beam emitted from the light source 101 transmits through the beam splitter 103, is transformed into substantially parallel light by the collimating lens 104, transmits through the afocal lens 105 and light flux diameter of the blue-violet laser beam is spread, and is focused through the protective substrate as a light spot on an information recording surface of the first optical disk 50 by the objective lens 106. A returning blue-violet laser beam that is reflected at the information recording surface of the first optical disk 50 transmits through the objective lens 106, the afocal lens 105, and the collimating lens 104 on a same light path as the advancing path. Then, the returning blue-violet laser beam is reflected by the beam splitter 103, given predetermined astigmatism by the detection lens 108, guided to the light-receiving element 109. The returning blue-violet laser beam then generates an information signal and a servo signal.

Next, with FIG. 2, an operation of the optical head 110 in a case in which information is recorded or reproduced on the second optical disk 60 is described. The blue-violet laser beam emitted from the light source 101 transmits through the beam splitter 103, is transformed into substantially parallel light, transmits through the afocal lens 105 and light flux diameter of the blue-violet laser beam is spread. Then, after being diffracted by the objective lens 106, the blue-violet laser beam is focused, through the protective substrate, as a light spot on the information recording surface of the second optical disk 60. A returning blue-violet laser beam that is reflected on the information recording surface of the second optical disk 60 transmits through the objective lens 106, the afocal lens 105, and the collimating lens 104 on the same light path as the advancing path. Then, the returning blue-violet laser beam is reflected by the beam splitter 103, given predetermined astigmatism by the detection lens 108, guided to the light-receiving element 109. The returning blue-violet laser beam then generates an information signal and a servo signal.

Generation of a focus error signal for recording or reproducing on the first optical disk 50 and the second optical disk 60 is capable of using a so-called astigmatism method, etc. that detects a light-condensing spot to which the detection lens 108 gives astigmatism, by means of a four-divided light-receiving pattern in the light-receiving element 109. In addition, generation of a tracking error signal is capable of using a so-called 3-beam method or differential push-pull method (DPP method), etc., that uses a main beam and a sub-beams generated by a diffraction grating (not shown).

In the following, the afocal lens 105 and the objective 106 will be described in detail.

First, the objective lens 106 is described.

Figure 3:
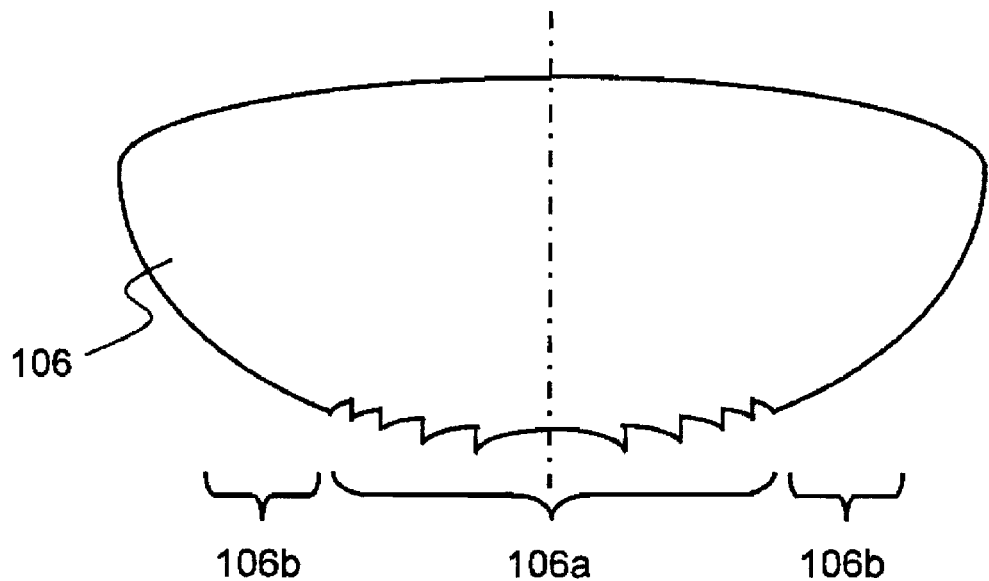
FIG. 3 is an enlarged view of an objective lens shown in FIG. 1 and FIG. 2.

In the objective lens 106 of hologram integrated type, as shown in FIG. 3, a concentric grating pattern 106a that functions as a diffraction part is formed on a surface on the side of the afocal lens 105, and the center of the concentric grating pattern 106a matches the light axis of the objective lens 106 of hologram integrated type. In addition, the grating pattern 106a is formed only within a diameter that is smaller than an aperture to be determined by the objective lens 106 of hologram integrated type. Thus, no diffraction occurs in any part 106b where the grating pattern 106a is not formed.

The diffraction efficiency of a plus-first-order diffracted light of the objective lens 106 of hologram integrated type is less than 100%, and thus the lens is designed so that transmitted light (zero-order diffracted light) has also sufficient intensity. In addition, the objective lens 106 of hologram integrated type can increase the sum of light quantity of the zero-order diffracted light and the plus-first-order diffracted light through blazing, thereby improving the light utilization efficiency.

Herein, if the objective lens 106 of hologram integrated type is used, both in a reproduction-only optical head, for the first optical disk 50 and the second optical disk 60, for instance, it is desirable to set the diffraction efficiency of the plus-first-order diffracted light to about 30% to 70%. Setting such the diffraction efficiency could achieve the effect that information can be reproduced from the first optical disk 50 and the second optical disk 60 with almost comparable amount of light, thereby reducing output of the light source.

On the other hand, if the objective lens 106 of hologram integrated type is used in reproduction-only optical head on the second optical disk 60 and in the optical head capable of recording and reproducing on the first optical disk 50, it is desirable to set the diffraction efficiency of the plus-first-order diffracted light to 30% or lower. Setting such the diffraction efficiency could increase the transmittance of the objective lens 106 of the hologram integrated type (diffraction efficiency of zero-order diffracted light) and thus achieve the effect of improving the light utilization efficiency for the first optical disk on which recording is to perform, thereby reducing output of the light source during recording.

Figure 4A:
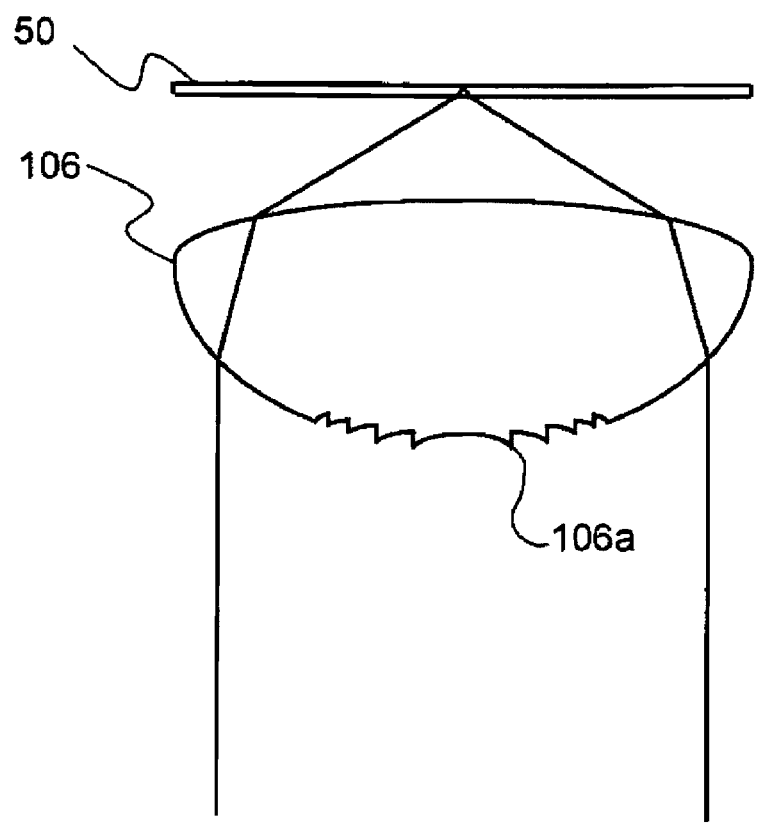
FIG. 4A is a view showing the action and state of the objective lens provided in the optical head in FIG. 1 and the first optical disk.

The objective lens 106 of hologram integrated type has the numerical aperture (NA) of 0.85, and, as shown in FIG. 4A, is such designed that when the laser beam that transmits through the objective lens 106 of hologram integrated type without being diffracted (i.e., the zero-order diffracted light) enters, a light-condensing spot of the diffraction limit can be formed on the first optical disk 50 having the protective substrate being about 0.1 mm thickness.

Figure 4B:
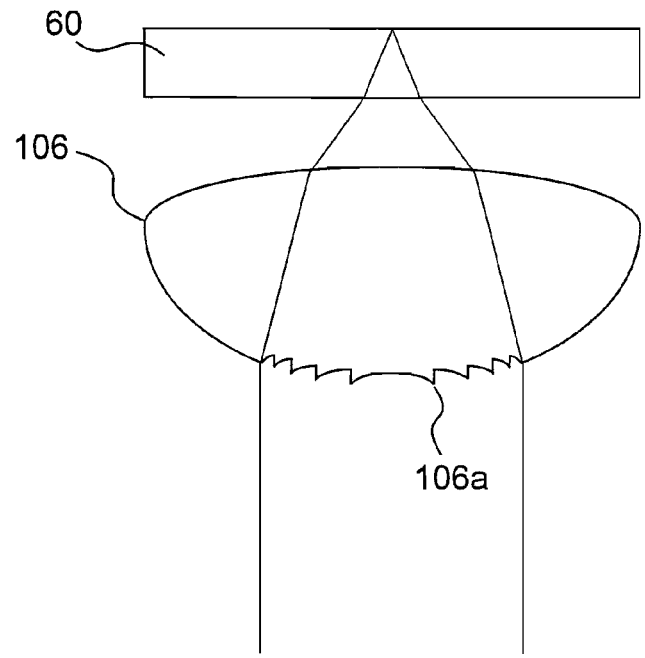
FIG. 4B is a view showing the action and state of the objective lens provided in the optical head in FIG. 1 and the second optical disk.

On the other hand, as shown in FIG. 4B, the plus-first-order diffracted light diffracted by the objective lens 106 of hologram integrated type is focused on the second optical disk 60. Herein, the plus-first-order diffracted light is subjected to aberration correction so that a light condensing spot of the diffraction limit can be formed on the second optical disk 60 having the protective substrate being about 0.6 mm thickness.

Thus, the objective lens 106 of hologram integrated type that diffracts part of incident light can implement a bifocal lens capable of forming on optical disks having different substrate thickness light-condensing spots that can be respectively focused to the diffraction limit.

Furthermore, the objective lens 106 of hologram integrated type or the present embodiment has the effect of adding power of a concave lens to the plus-first-order diffracted light with respect to the zero-order diffracted light, a focal position of the plus-first-order diffracted light with respect to the objective lens 106 of hologram integrated type is farther than that of the zero-order diffracted light. Thus, if the plus-first-order diffracted light is focused on the information recording surface of the second optical disk 60 having a thicker protective substrate than the first optical disk 50, the WD (working distance) that is a distance between the second optical disk 60 and the objective lens 106 of hologram integrated type can be easily ensured.

As such, as the objective lens 106 of hologram integrated type has the concave lens action to the plus-first-order diffracted light, positions in an optical axis direction of the two focal points of the zero-order diffracted light for recording or reproducing on the first optical disk 50 and the plus-first-order diffracted light for recording or reproducing on the second optical disk 60 are different. Thus, when information is recorded or reproduced using a light spot formed on one focal point, no effect will be given to information recording or reproduction because a light spot formed on the other focal point is widely spread.

In the following, the afocal lens 105 is described. The afocal lens 105 is a lens having an infinite focal length, and located between the collimating lens 104 and the objective 106 as shown in FIGS. 1, 2, 7 and 8. As shown in the FIGS., a surface on the side of the collimating lens 104 of the afocal lens 105, namely, an entrance face 105a on the advancing path of the laser beam, is formed concavely, while a surface on the side of the objective lens 106 of the afocal lens 105, namely, an exit face 105b on the advancing path of the laser beam is formed convexly. Shaped as such, the afocal lens 105 spreads an effective light flux diameter d1 of the laser beam that entered from the collimating lens 104, and emits substantially parallel light having an effective light flux diameter d2, to the objective lens 106.

Figure 21A:
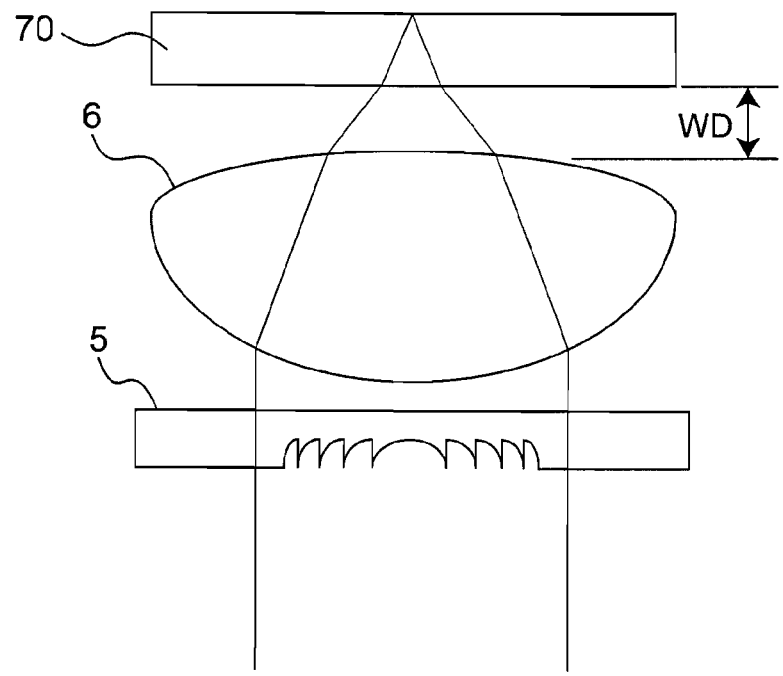
FIG. 21A is a view showing functions of the hologram lens and objective lens of the conventional optical head.
Figure 21B:
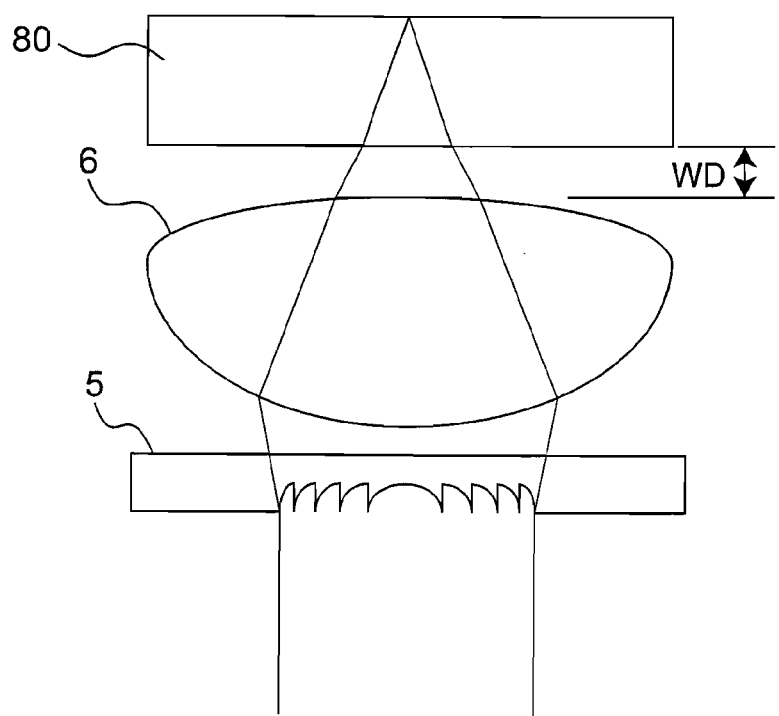
FIG. 21B is a view showing functions of the hologram lens and objective lens of the conventional optical head.

Herein the reason why the afocal lens 105 is provided is described. As described above with reference to FIG. 21A and FIG. 21B, in the compatible optical head that can be shared for each optical disk having different protective substrate thickness, a difference is generated in the WD. The phenomenon similarly occurs in the above-described optical head using the blue-violet laser beam, and the WD is smaller on optical disks having thicker protective substrates, compared with those having thin protective substrates. If the WD is smaller than a specified value, it may be possible that there will be interference with an optical disk and an objective lens. Thus, it is necessary to ensure a predetermined WD. On the other hand, an angle of light to be emitted from the objective lens, in other words, NA (numerical aperture) of the objective lens, is specified. Thus, in order to ensure the above WD while satisfying the above NA, a light flux diameter of the laser beam entering the objective lens just has to be increased. As one of the methods of increasing the light flux diameter, a method of increasing the entire optics system from a light source to a beam splitter and to a collimating lens is possible. However, the method conflicts with the compactification required for the optical head.

Hence, as shown in the present embodiment, the afocal lens 105, which functions as a light flux spreading lens, is arranged between the collimating lens 104 and the objective lens 106. Then, laser beam having the effective light flux diameter that has been expanded with respect to the light flux diameter of light incident to the afocal lens 105 and being substantially parallel light is emitted onto the objective lens 106. This enables the compactification of the optical head having the compatibility to both the first optical disk 50 and second optical disk 60 with the NA and the WD set to specified values. In the optical head in the respective embodiments, the WD is set to 0.3 mm or longer, for instance.

In addition, provision of the afocal lens 105 enables laser beam having the effective light flux diameter sufficient for the objective lens 106 to enter, even when the light flux diameter of the incoming light on the returning path to the afocal lens 105 is smaller than the conventional one. Thus, provision of the afocal lens 105 further allows the configuration of the optics system from the light source 101 to the beam splitter 103 and to the collimating lens 104 to be made smaller than the conventional configuration. Hence, this can contribute to further downsizing of the optical head 110.

In addition, in the present embodiment, the afocal lens 105 has a wavelength variation correction part 1051 having the diffraction lens action, as shown in FIGS. 1, 2, 7 and 8.

The light source 101 emits the blue-violet laser beam having a reference wavelength of 408 nm. However, the reference wavelength fluctuates slightly, due to manufacturing variations in semiconductor laser devices provided in the light source 101 or switching of laser beam output accompanying recording and reproduction of information onto/from optical disks, etc. Therefore, the afocal lens 105 has a diffraction grating for canceling such wavelength variations, in other words, for correcting chromatic aberration as the wavelength variation correction part 1051. The afocal lens 105 is formed by concentric grating patterns in which the wavelength variation correction part 1051 is provided with the convex lens power, and when parallel light having the reference wavelength of 408 nm enters, diffraction power of the convex lens will equal refraction power of the concave lens. When a wavelength of the laser beam is longer with respect to the reference wavelength, the diffraction angle at the wavelength variation correction part 1051 increases, thus intensifying convex power, and the focal lens 105 functions as a lens that emits focused light when parallel light enters. On the other hand, when a wavelength of the laser beam is shorter with respect to the reference wavelength, the diffraction angle at the wavelength variation correction part 1051 will be smaller and concave power will be stronger, and thus the focal lens 105 functions as a lens that emits divergent light. The diffraction grating forming the wavelength variation correction part 1051 has the greater effect of chromatic aberration, when the forming pitch thereof is finer. As described above, one refracting surface is concave and the other refracting surface is convex. Thus, manufacturing of the afocal lens 105 becomes easier when the wavelength variation correction part 1051 is formed on the convex refracting surface where it has a wider surface area and the effective light flux diameter is greater, namely, on the surface 105b faced into the objective lens 106.

However, this embodiment is not limited to, and the wavelength variation correction part 1051 may be formed on the surface 105a faced into the collimating lens 104 of the afocal lens 105.

On the other hand, there has been no document that discloses a relationship between lens power in a diffraction lens and concave and convex surfaces in an afocal lens when the diffraction lens is formed in a meniscus shaped afocal lens. Thus, the applicant examined the relationship as described below.

Figure 13:
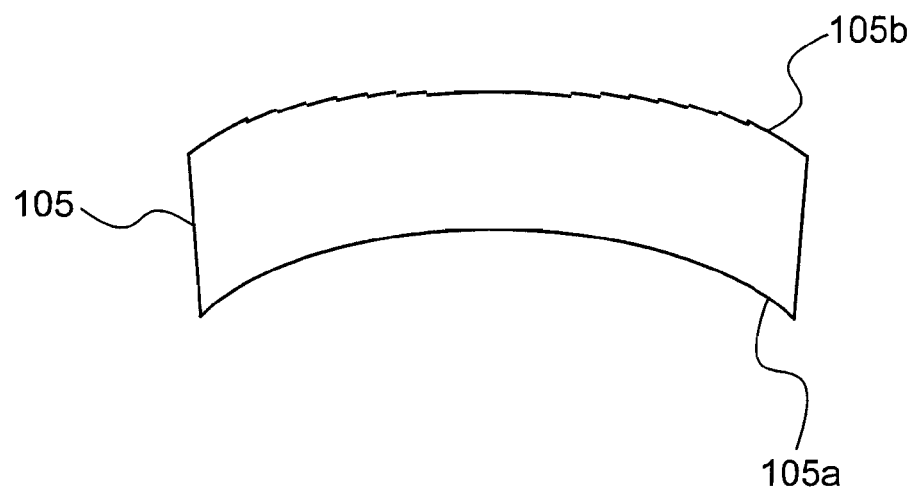
FIG. 13 is an enlarged view of the afocal lens as shown in FIG. 1, etc.
Figure 14:
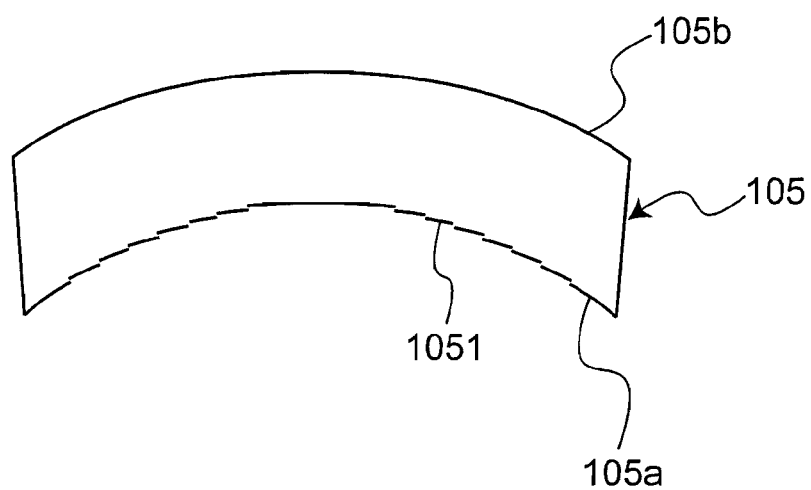
FIG. 14 is a view showing the case in which a wavelength variation correction part is formed on a concave surface of the afocal lens as shown in FIG. 1, etc.

In fact, as described earlier, formation of the wavelength variation correction part 1051 on the surface 105b faced into the objective lens 106 of the afocal lens 105 is advantageous from the perspective of the pitch of the diffraction grating that forms the wavelength variation correction part 1051. However, a fabrication of a die for molding the afocal lens may become difficult because the wavelength variation correction part 1051 having the convex lens action is formed on the convex refracting surface of the afocal lens 105 and thus, as shown in FIG. 13, the angle to the refracting surface in the diffraction grating that forms the wavelength variation correction part 1051 will be sharper. On the other hand, if the wavelength variation correction part 1051 is formed on the surface 105a faced into the collimating lens 104 of the afocal lens 105, namely, on the concave refracting surface, the curvature radius of the surface 105a will be smaller, thus decreasing the pitch of the diffraction grating. However, since the wavelength variation correction part 1051 having the convex lens action is formed on the surface 105a that is the concave refracting surface, as shown in FIG. 14, the angle to the refracting surface in the diffraction grating will be an obtuse angle, thus making it relatively easier to fabricate the die for molding the afocal lens.

Hence, considering the above points, we may just select a surface of the afocal lens 105 on which the wavelength variation correction part 1051 is formed.

More specifically, if a diffraction lens such as the wavelength variation correction part 1051 is formed on a meniscus-shaped afocal lens having a concave refracting surface and a convex refracting surface opposed to the concave refracting surface, generally speaking, it is possible to make obtuse an angle to the refracting surface in a diffraction grating, by forming the diffraction lens on the refracting surface of the afocal lens, the refracting surface having lens power (lens action) opposite to concave or convex lens power in the diffraction lens. Hence, when a diffraction lens has the convex lens power, for instance, the diffraction lens may be formed on the concave refracting surface of the afocal lens. On the contrary, when a diffraction lens has the concave lens power, the diffraction lens may be formed on the convex refracting surface of the afocal lens.

Here again, the relationship is not limited to an afocal lens to be provided at an optical head, but can be applied to any afocal lens to be provided in optics systems in other fields.

Physically, a diffraction grating for correcting chromatic aberration has so-called the convex power that acts to focus parallel light. Thus, in order to emit parallel light from a diffraction grating for correcting chromatic aberration, spread light whose light flux spreads to the extent that the spread light offset the convex power might have to be emitted onto the diffraction grating for correcting chromatic aberration. From this point of view, there exists a member for correcting chromatic aberration having a concave entrance face. However, such the member for correcting chromatic aberration is designed to expand light flux to an extent that light flux can cancel the convex power, with the view to emit parallel light as described earlier, and thus an expansion ratio of a light flux diameter of the outgoing light to that of the incoming light is at most about 1 to 5%. Hence, the member for correcting chromatic aberration is completely different from the afocal lens 105 according to the present embodiment that is configured to aggressively expand the light flux diameter. An expansion ratio of a light flux diameter of the afocal lens 105 in the present embodiment is set to 1.1 times or greater and 1.5 times or smaller. Herein, in the afocal lens 105, the expansion ratio is a scale factor satisfying $D1 \times 1.1 \leq D2 \leq D1 \times 1.5$, where D1 is a light flux diameter of the laser beam entering from the surface on the side of the collimating lens 104 in the afocal lens 105, and D2 is a light flux diameter of the laser beam to be emitted from the surface on the side of the objective lens 106 in the afocal lens 105.

The expansion ratio of the light flux diameter in the afocal lens 105 in the present embodiment will be described.

First, the minimum expansion ratio of 1.1 times is described. As described above, in the optical head 110 in the present embodiment, it is one of the objects to promote compactifying of the optical head having the compatibility to both the first optical disk 50 and the second optical disk 60. Since the expansion ratio of about 1 to 5% as described above does not contribute to the compactifying, we decided to adopt the value of 1.1 times as a minimum value that can contribute to the compactifying.

Then, the maximum expansion ratio of 1.5 times is described. As described above, the optical head is required to be compactified, which also similar to the objective lens provided in the optical head. In addition, since the entire optical head 110 not only coarsely moves with respect to the optical disks 50, 60, but also performs tracking control on the optical disks 50, 60, the optical head 110 according to the present embodiment has such structure that the afocal lens 105 and the objective lens 106 moves faintly as a unit. Herein, if it is assumed that a shift amount of the objective lens 106 that moves faintly as a unit with the afocal lens 105 is ±150 μm, for instance, and other error to be taken into consideration, such as displacement of the objective 106, is 50 μm, a displacement of the afocal lens 105 and the objective lens 106 with respect to the incoming light flux will be ±200 μm (0.2 mm) at a maximum. Herein, if the displacement is too large with respect to the light flux diameter of the incoming light to the objective lens 106, an amplitude of a tracking error signal during shift will be reduced. In general, when an objective lens shifts more than 10% of a light flux diameter of incoming light to the objective lens, the decrease in the amplitude of the tracking error signal will be remarkable. In the present embodiment, as the objective lens 106 moves faintly as the unit with the afocal lens 105, it is desirable to control the displacement to about 10% of the light flux diameter of the incoming light to the afocal lens 105. Therefore, it is desirable to ensure 2.0 mm or larger for the light flux diameter of the incoming light on the advancing path to the afocal lens 105.

On the contrary, the size of the objective lens 106 is to be determined in view of ensuring the WD, while considering the case of the optical disk 60 whose WD is smaller, as described above.

For instance, when the objective lens 106 is designed to ensure the NA of 0.85 and the working distance WD of 0.50 mm for the first optical disk 50 and that can ensure the NA of 0.65 and the working distance WD of 0.30 mm for the second optical disk 60, the focal length of the objective lens 106 to the first optical disk 50 will be about 1.7 mm, and the focal length of the objective lens 106 to the second optical disk 60 will be about 1.85 mm.

When information is recorded or reproduced onto/from the first optical disk 50, the light flux diameter of the laser beam entering the objective lens, in other words, the light flux diameter of the substantially parallel light to be emitted from the afocal lens 105, will be 2.89 (=1.7×0.85×2) mm. Thus, the expansion ratio of the afocal lens 105 will be 2.89/2.0=1.445, namely, about 1.5 times.

On the other hand, when information is recorded or reproduced onto/from the second optical disk 60, the light flux diameter of the laser beam entering the objective lens, in other words, the light flux diameter of the substantially parallel light to be emitted from the afocal lens 105, will be 2.405 (=1.85×0.65×2) mm. Thus, the expansion ratio of the afocal lens 105 will be 2.405/2.0=1.2025, namely about 1.2 times.

As described above, it is desirable that the maximum expansion ratio of the afocal lens 105 is 1.5 times or smaller, and more desirable that it is 1.2 times or smaller.

Figure 5:
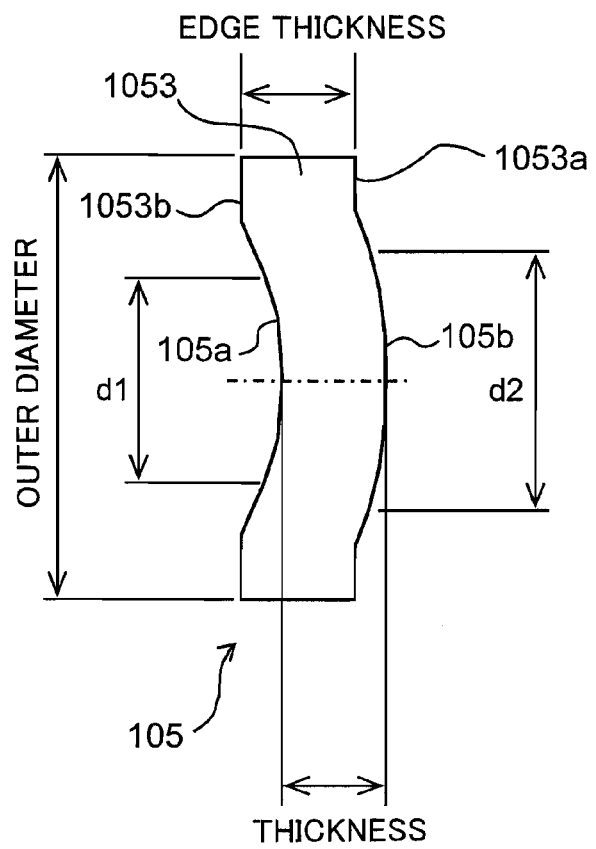
FIG. 5 is a view for illustrating an afocal lens shown in FIG. 1 and FIG. 2.
Figure 6:
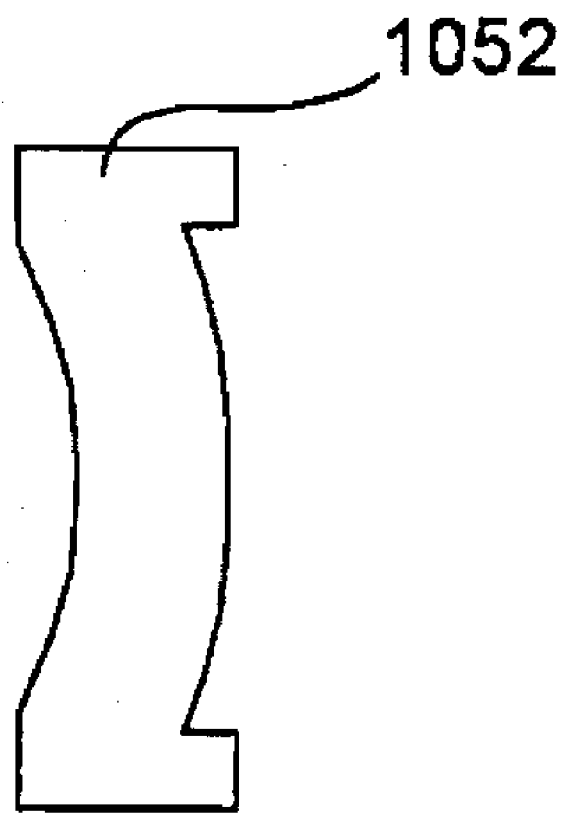
FIG. 6 is a view showing a shape of an afocal lens that is fabricated by a method different from that of fabricating the afocal lens shown in FIG. 1 and FIG. 2.

The afocal lens 105 having the configuration described above can be made from resin material, for instance, and molded with a die. Then, an edge portion 1053 for holding the lens is not shaped like an edge portion 1052 as shown in FIG. 6. As shown in FIG. 5, the edge portion 1053 of the afocal lens 105 is specified so that the effective surface 105b faced into the objective lens 106 of the afocal lens 105 protrudes from an edge surface 1053a of the edge portion 1053. The edge surface is a surface substantially perpendicular to the optical axis of the laser beam to the afocal lens 105, and corresponds to an edge surface 1053b on the side of the collimating lens 104 and the edge surface 1053a on the side of the objective lens 106. One of these edge surfaces is used as a reference plane for positioning, when the afocal lens 105 is positioned with respect to a holder, etc.

Flow of resin, so-called fluidity of the molten resin, improves during molding of the afocal lens 105 by specifying such the edge portion 1053.

Second Embodiment

Figure 7:
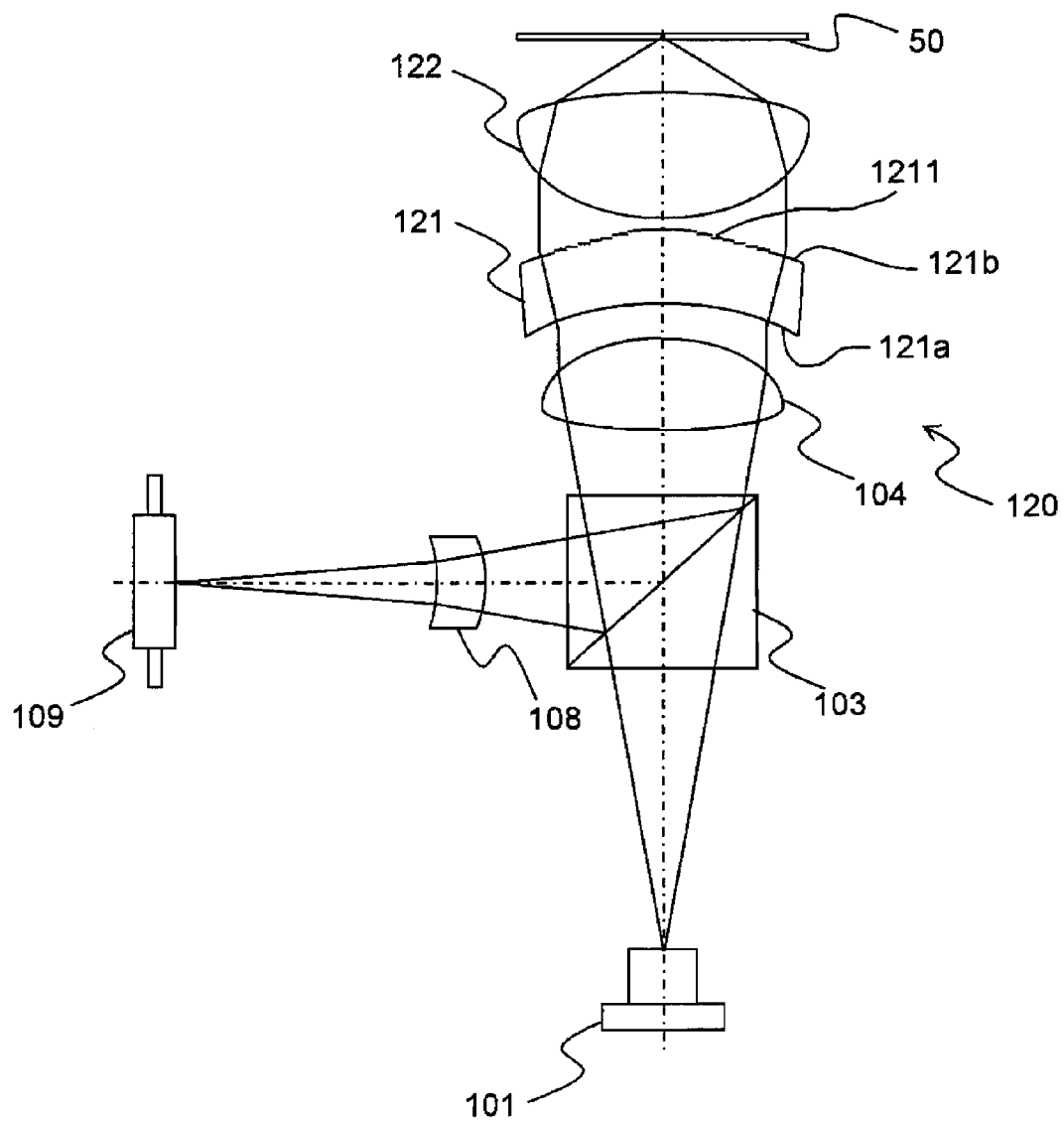
FIG. 7 is a view showing the configuration in other examples of the optical head in embodiments of the present invention.

In addition, an afocal lens may adopt such the configuration as that shown in FIG. 7.

Among the configurations of the optical head 110 described above with reference to FIG. 1 and FIG. 2, FIG. 7 shows an optical head 120 having the configuration in which the afocal lens 105 and the objective lens 106 are replaced by an afocal lens 121 and an objective lens 122. Other components and the function thereof in the optical head 120 are same as the components and the function of the optical head 110. FIG. 7 also shows the case in which the optical head 120 acts on the first optical disk 50. However, similar to the optical head 110 as described above, the optical head 120 is also a compatible optical head that can be used on the first optical disk 50 and the second optical disk 60. Thus, the optical head 120 can also act on the second optical disk 60.

The objective lens 122 shown in FIG. 7 is an objective lens made by deleting the concentric grating pattern 106a that functions as the diffraction part from the objective lens 106, and designed to have the specified NA, focal length, etc. so that it can record and reproduce information on the first optical disk 50.

The focal lens 121 shown in FIG. 7 is a lens provided with the concentric grating pattern 106a functioning as the diffraction part formed on the objective lens 106, on a surface 121b faced into the objective lens 122 of the afocal lens 121. More specifically, there is formed a diffraction and wavelength variation correction part 1211 that has been formed by superimposing the concentric grating pattern 106a and a diffraction grating constituting the above-described wavelength variation correction part 1051 on a surface 121b on the side of the objective lens 122 of the afocal lens 121.

As such, there is an advantage that formation of the diffraction and wavelength variation correction part 1211 on one surface of the afocal lens 121 enables a die for molding the afocal lens 121 to be processed on one surface. There is another advantage that fabrication of the objective lens is made very easy, as it is no longer necessary to form the grating pattern 106a on the objective lens 122.

Since the afocal lens 121 has the grating pattern 106a, the optical head 120 having the afocal lens 121 and the objective lens 122 as described above is capable of recording and reproducing information onto/from the first optical disk 50 and the second optical disk 60, and can also perform chromatic aberration of the laser beam during the recording and reproducing because the afocal lens 121 has the wavelength variation correction part 1051. In fact, the optical head 120 can also achieve the same function and effect as those of the optical head 110.

As described earlier, the optical head 120 has the diffraction and wavelength variation correction part 1211 on the surface 121b on the side of the objective lens 122 of the afocal lens 121. This is because the surface 121b on the side of the objective lens 122 has a wider surface area and a larger effective light flux diameter than a surface 121a faced into the collimating lens 104 of the afocal lens 121, and because the formation is easier, compared with the case in which the diffraction and wavelength variation correction part 1211 is formed on the surface 121a on the side of the collimating lens 104 of the afocal lens 121. However, this embodiment is not limited to, and the diffraction and wavelength variation correction part 1211 may be formed on the surface 121a on the side of the collimating lens 104.

Third Embodiment

Figure 8:
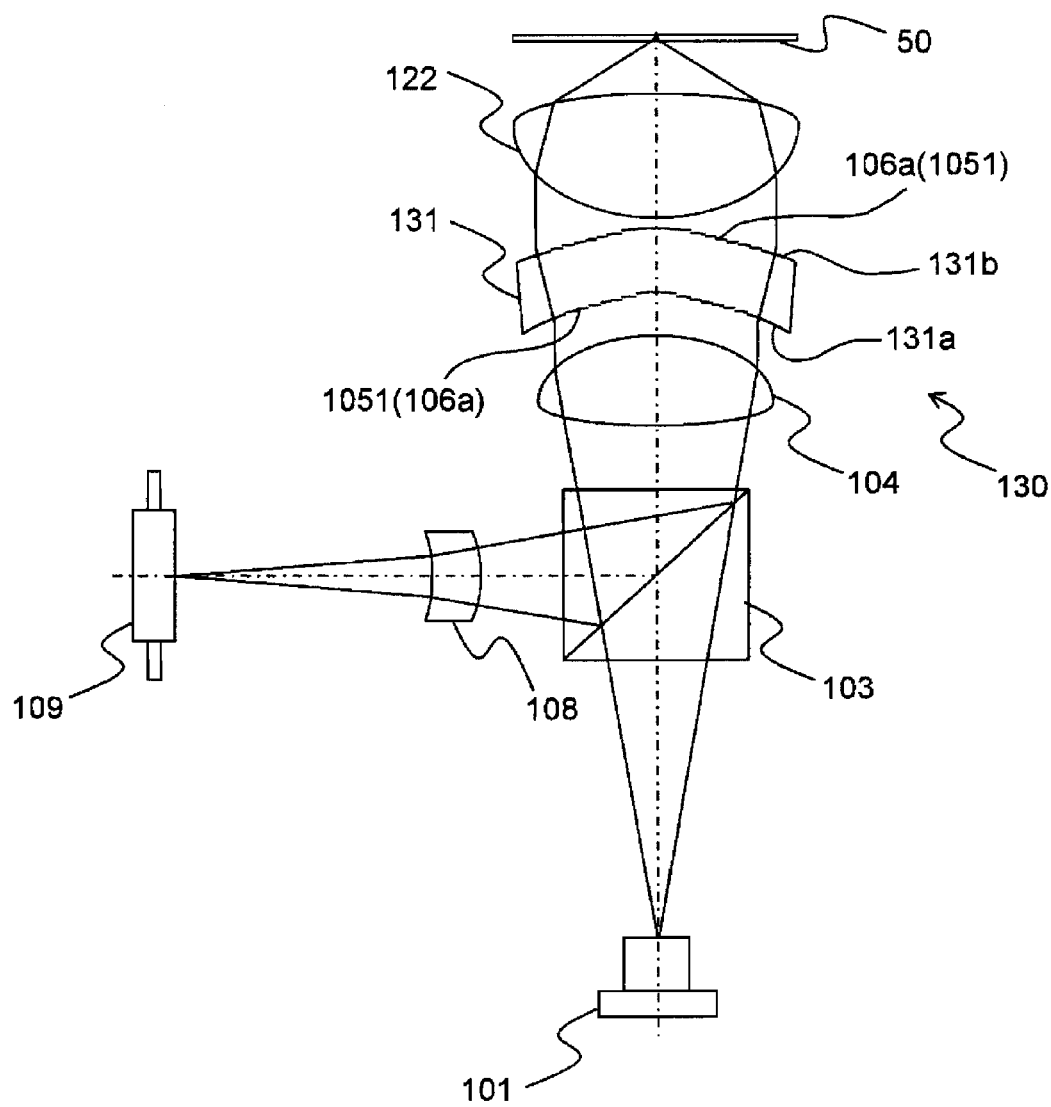
FIG. 8 is a view showing the configuration in a variant example of the optical head shown in FIG. 7.

In addition, an afocal lens may adopt the configuration as shown in FIG. 8.

Among the configurations of the optical head 120 described above with reference to FIG. 7, FIG. 8 shows an optical head 130 having the configuration in which the afocal lens 121 is replaced by an afocal lens 131. Other components and the function thereof in the optical head 130 are same as the components and the function of the optical head 120. FIG. 8 also shows the case in which the optical head 130 acts on the first optical disk 50. However, similar to the optical heads 110, 120 as described above, the optical head 130 is also a compatible optical head that can be used on the first optical disk 50 and the second optical disk 60. Thus, the optical head 130 can also act on the second optical disk 60.

The afocal lens 131 shown in FIG. 8 has the function similar to those of the afocal lens 121 described above. In fact, while in the afocal lens 121, the diffraction and wavelength variation correction part 1211 is formed on the surface 121b on the side of the objective lens 122 by superimposing the grating pattern 106a and the diffraction grating that constitutes the wavelength variation correction part 1051, in the afocal lens 131, the concentric grating pattern 106a is formed on a surface 131b faced into the objective lens 122 and the diffraction grating that constitutes the wavelength variation correction part 1051 is formed on a surface 131a faced into the collimating lens 104.

Thus, there is an advantage that by forming the grating pattern 106a on the surface 131b on the side of the objective lens 122 of the afocal lens 131 and the diffraction grating that constitutes the wavelength variation correction part 1051 on the surface 131a on the side of the collimating lens 104, processing of a die for molding the afocal lens 131 can be facilitated, compared with the case in which the grating pattern that superimposed the diffraction and wavelength variation correction part 1211 is processed.

Since the afocal lens 131 has the grating pattern 106a, the optical head 130 having the afocal lens 131 and the objective lens 122 as described above is capable of recording and reproducing information onto/from the first optical disk 50 and the second optical disk 60, and can also perform the chromatic aberration of the laser beam during the recording and reproducing because the afocal lens 131 has the wavelength variation correction part 1051. In fact, the optical head 130 can also achieve the same function and effect as those of the optical heads 110 and 120.

As described above, in the optical head 130, the grating pattern 106a is formed as the diffraction part on the surface 131b on the side of the objective lens 122 of the afocal lens 131. This is because it is easier to form the grating pattern 106a on the surface 131b on the side of the objective lens 122 that is convex and has a wider surface area and a greater effective light flux diameter than the surface 131a on the side of the collimating lens 104 of the afocal lens 131, since the grating pattern 106a has the finer pitch to form a grating than the diffraction grating of the wavelength variation correction part 1051.

There is another advantage that an angle to the refracting surface in the diffraction grating will be obtuse by forming the wavelength variation correction part 1051 that has the convex lens action, on the surface 131a faced into the collimating lens 104 of the afocal lens 131, that is, a concave refracting surface, which thus makes it relatively easy to fabricate a die for molding the afocal lens.

Hence, considering the above points, we may just select a surface of the afocal lens 105 on which the wavelength variation correction part 1051 is formed.

However, this embodiment is not limited to, and the wavelength variation correction part 1051 may be formed on the surface 131b on the side of the objective lens 122, and the grating pattern 106a may be formed on the surface 131a on the side of the collimating lens 104.

In addition, in the first to third embodiments as described above, it is also possible to include a configuration that can reduce possible effect of stray light. The stray light is light that unnecessary diffraction light not contributing to recording or reproduction of information is reflected at a surface of the optical disk and then enters a light-receiving device when the information is recorded or reproduced to/from the optical disk having a higher reflectivity at the surface of the disk than an information recording surface. For instance, it is also possible to further comprise the configuration of an optical head provided with:

a light source;

a diffraction element that diffracts laser beam emitted from the light source so as to generate diffracted light with a plurality of orders;

wherein n and m are integers that differ from each other, an objective lens that focuses n-order diffracted light generated at the diffraction element onto an information recording surface of a first information recording medium, and that focuses m-order diffracted light onto an information recording surface of a second information recording medium;

a condensing lens that condenses laser beam reflected at the information recording surface of the first information recording medium or that of the second information recording medium; and a light-receiving unit that receives the laser beam condensed by the condensing lens and generates respective focus error signals, wherein a light path of laser beam before being reflected at the information recording medium is an advancing path and a light path of laser beam after being reflected at the information recording medium is a returning path, a position where diffracted light that is reflected at the information recording surface of the first information recording medium and that is n-order on the advancing path and n-order on the returning path is condensed by the condensing lens, and a position where diffracted light that is reflected at a surface of the first information recording medium and that differs from n-order on at least one of the advancing path and the returning path is condensed by the condensing lens are different.

As another example, it is also possible to further include the configuration of an optical head provided with:

a light source;

a diffraction element that diffracts laser beam emitted from the light source so as to generate diffracted light with a plurality of orders;

wherein n and m are integers that differ from each other, an objective lens that focuses n-order diffracted light generated at the diffraction element onto an information recording surface of a first information recording medium and m-order diffracted light onto an information recording surface of a second information recording medium, and concentrates laser beam reflected at the information recording surface of the first information recording medium or that of the second information recording medium; and a light-receiving unit that receives the laser beam condensed by the condensing lens and generates respective focus error signals, wherein a light path of laser beam before being reflected at the information recording medium is an advancing path and a light path of laser beam after being reflected at the information recording medium is a returning path, a position where diffracted light that is reflected at the information recording surface of the first information recording medium and that is n-order on the advancing path and n-order on the returning path is condensed by the condensing lens, and a position where diffracted light that is reflected at a surface of the first information recording medium and that differs from n-order on at least one of the advancing path and the returning path is condensed by the condensing lens are different.

Fourth Embodiment

As described above, the optical heads 110, 120 and 130 in the first to third embodiments are optical heads that generate diffracted light having different orders from laser beam of same wavelength and can apply the generated diffracted light to both the first optical disk 50 and the second optical disk 60, namely, being compatible.

On the one hand, the afocal lenses 105, 121 and 131 described in the first to third embodiments are not limited to the application to the optical head that generates the diffracted light having different orders from laser beam of same wavelength, but applicable to an optical head provided with an objective lens that generates diffracted light from laser beam of wavelength being different to each other diffracted light having a same or different order, and that focuses these diffracted light onto information recording surfaces of different kinds of optical disks. Detailed description of these is mentioned in the following:

In general, a diffraction angle representative of lens power is determined by:

$$n \cdot \lambda = d \cdot \sin \theta$$

where n is a diffraction order, $\lambda$ is wavelength, and d is grating pitch.

The formula demonstrates that when laser beam is focused onto information recording surfaces of different kinds of optical disks, at least one of the diffraction order n and the wavelength $\lambda$ may be changed because the grating pitch d is a numeric value to be designed when a diffraction grating is designed. More specifically, if an optical head that is compatible to different kinds of optical disks is to be implemented, as described in the first to third embodiments, we may select whether to use diffracted light having the same wavelength and different orders, or diffracted light having different wavelengths and a same order, or diffracted light having different wavelengths and different orders.

Figure 18:
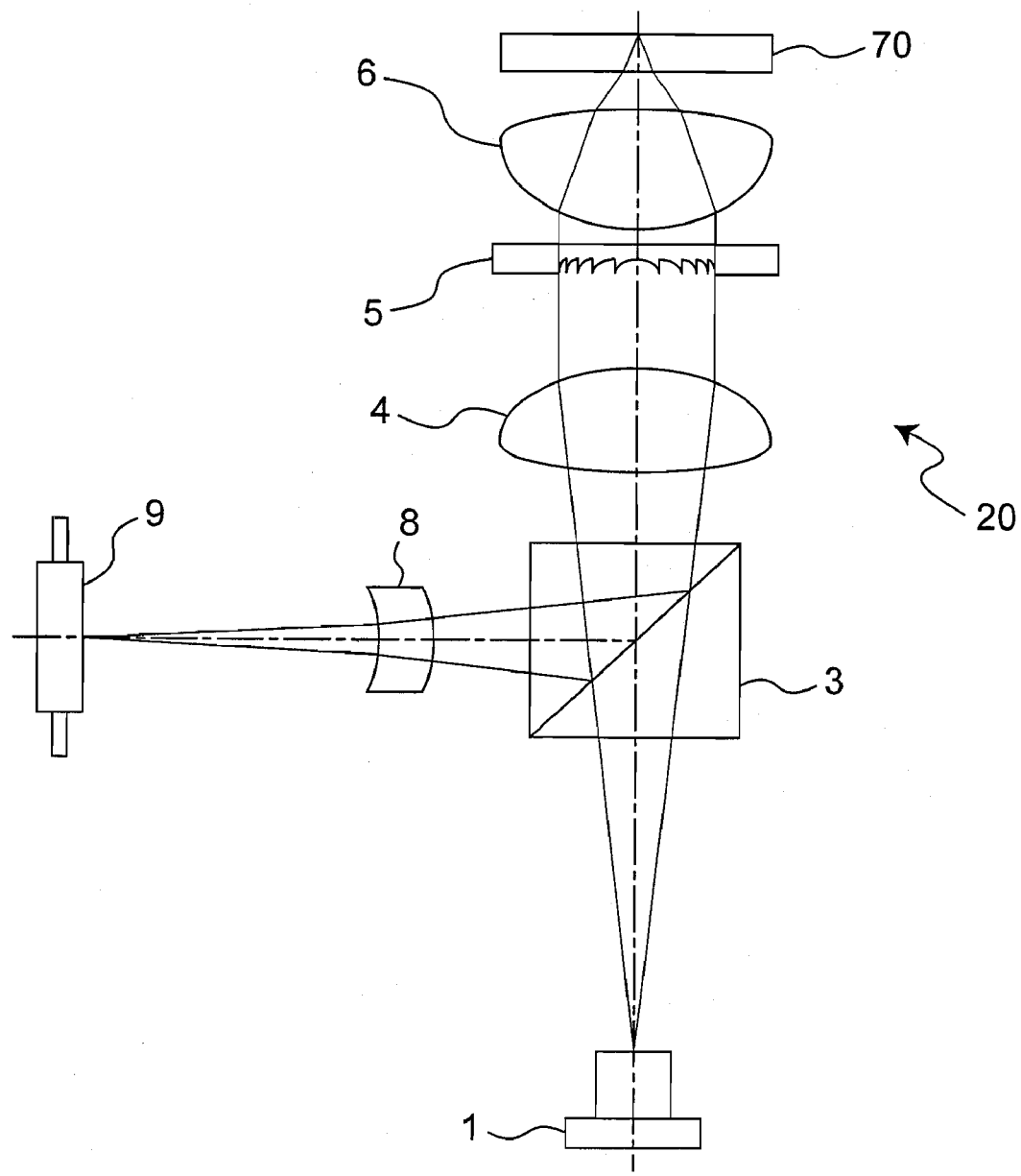
FIG. 18 is a view showing a schematic configuration of an optical head that records or reproduces on the DVD in the conventional optical head.
Figure 19:
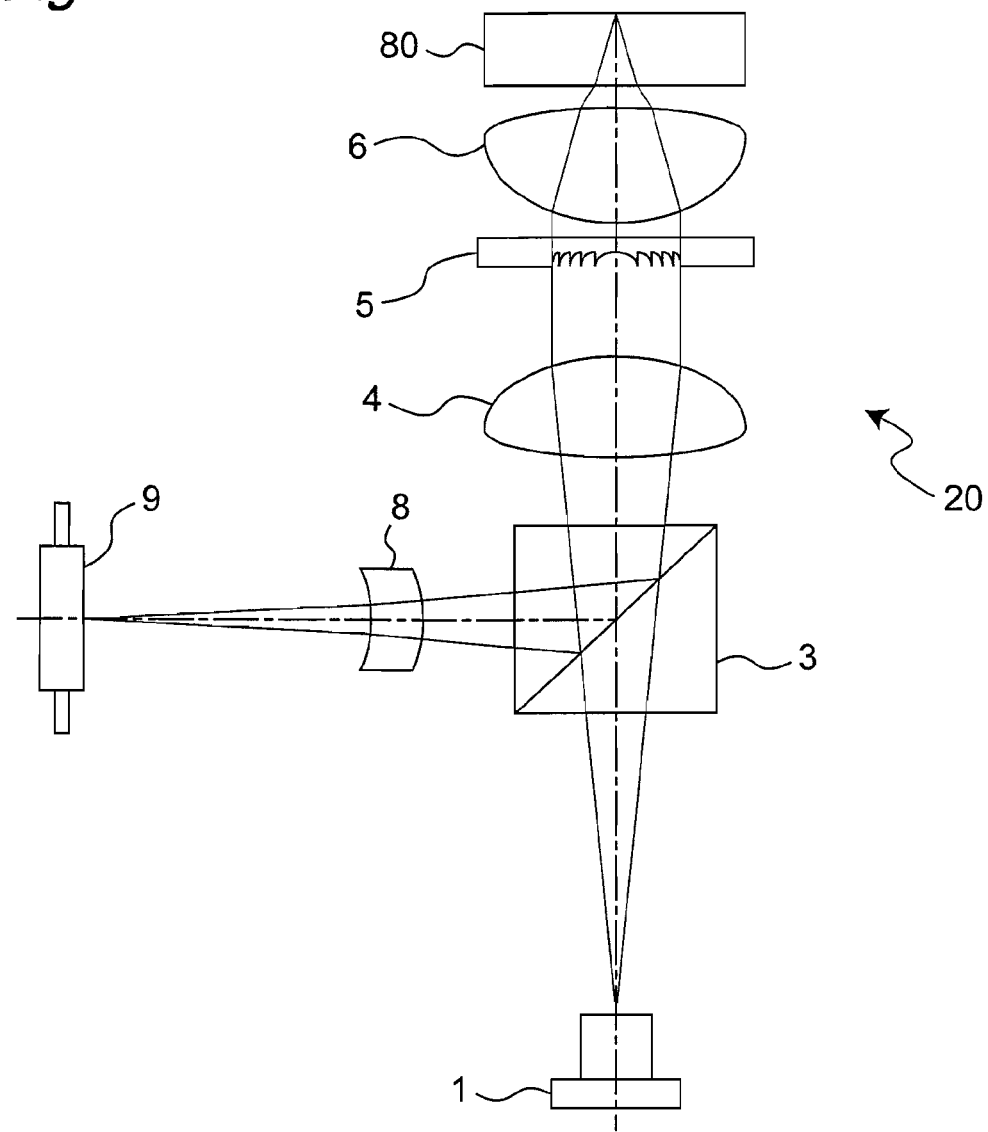
FIG. 19 is a view showing a schematic configuration of an optical head that records or reproduces on the CD in the conventional optical head.
Figure 20:
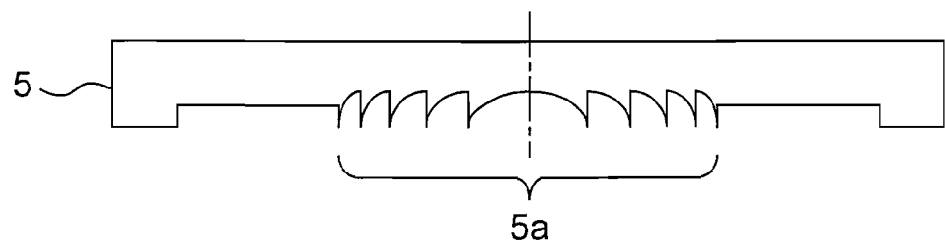
FIG. 20 is a view schematically showing the configuration of a hologram lens of the conventional optical head.

As the different kinds of optical disks, there are the first optical disk 50, the second optical disk 60, a DVD 70 as shown in FIG. 18 that is an optical disk having the protective substrate being 0.6 mm thickness, and a CD 80 as shown in FIG. 19 that is an optical disk having the protective substrate being 1.2 mm thickness. On the one hand, as we have already stated in the section of SUMMARY OF THE INVENTION, an optical head that can be shared on the different kinds of optical disks not only makes a difference in the WD (working distance) but also specifies the NA (numerical aperture) in the objective lens. Thus, for the optical head to be shared, it is necessary to ensure the WD to prevent possible interference of the objective lens and various kinds of optical disks, while satisfying the NA. The requirement is made of the optical head having the compatibility to the first optical disk 50, DVD 70 and CD 80, for instance. Therefore, adoption of the afocal lens 105, etc., described in the first to third embodiments can satisfy the requirement that the WD be ensured while NA is satisfied, and achieve the effects similar to that described in the first to third embodiments.

Figure 15:
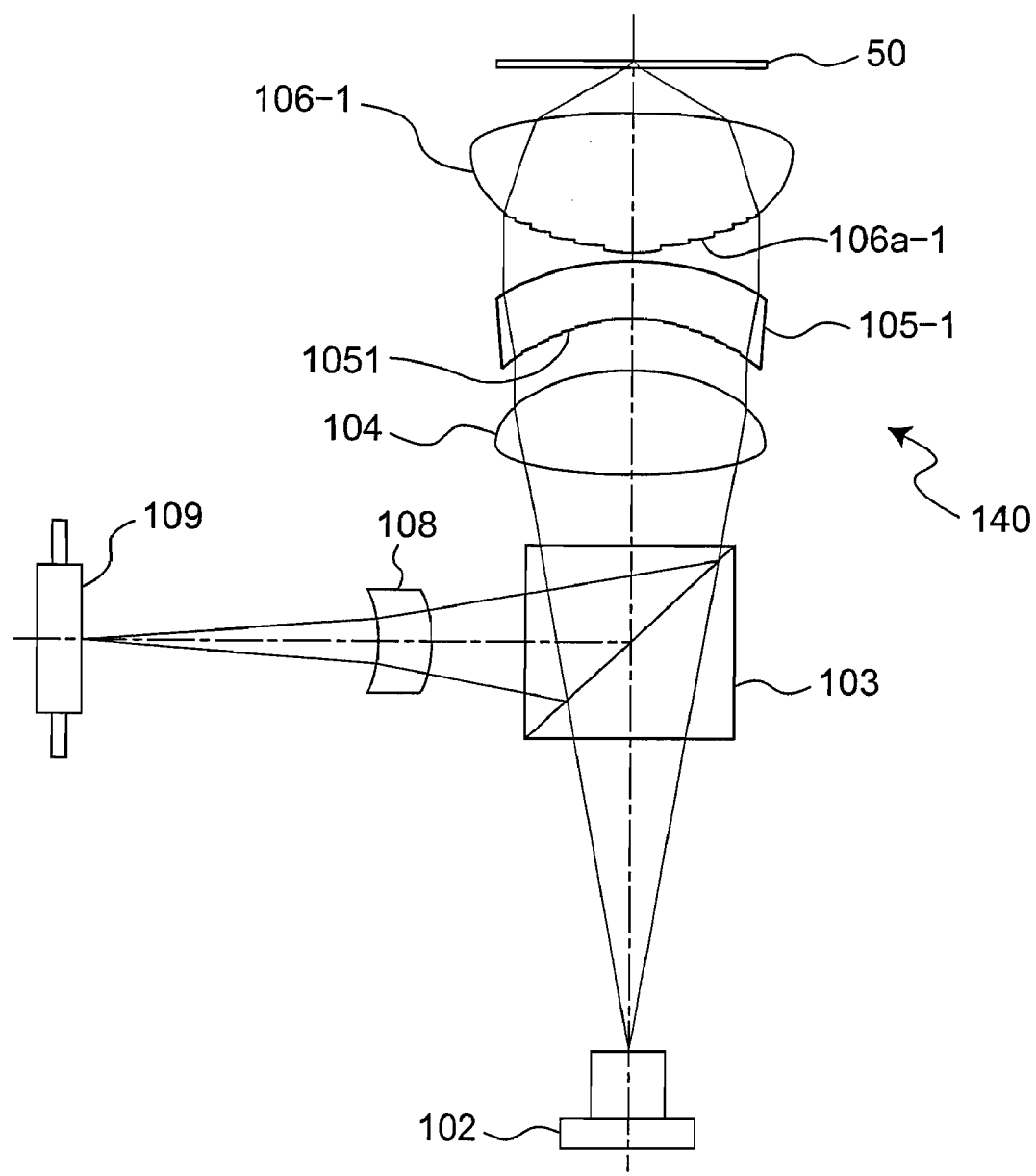
FIG. 15 is a view showing the configuration of an optical head that is compatible to three wavelengths in other embodiments of the present invention, which shows the case in which the optical head acts on the first optical disk.
Figure 16:
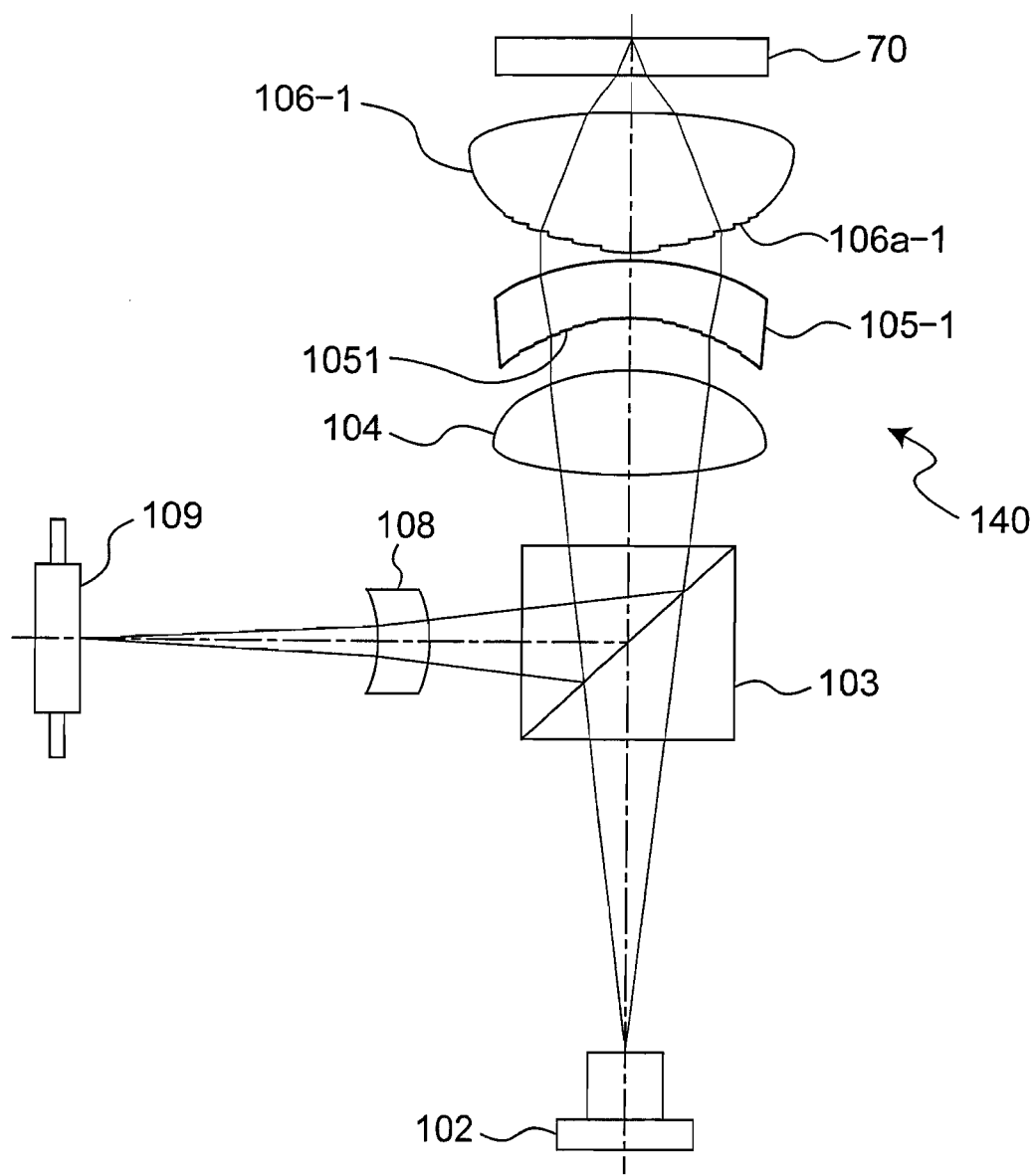
FIG. 16 is a view showing the configuration of the optical head as shown in FIG. 15 that is compatible to three wavelengths, which shows the case in which the optical head acts on the DVD.
Figure 17:
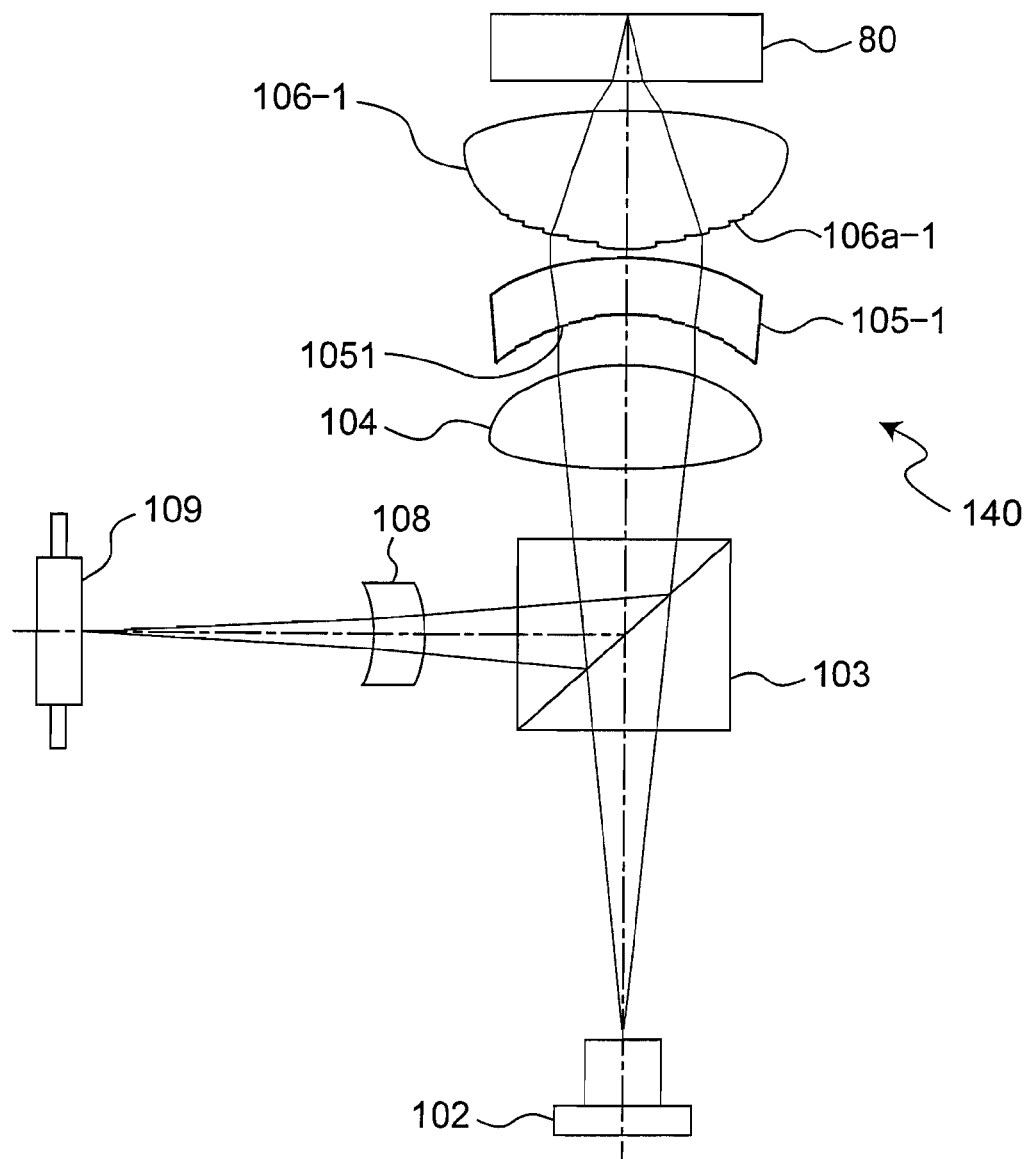
FIG. 17 is a view showing the configuration of the optical head as shown in FIG. 15 that is compatible to three wavelengths, which shows the case in which the optical head acts on the CD.

FIG. 15 to FIG. 17 show an optical head 140 having the compatibility. FIG. 15 shows the case in which the optical head 140 has access to the optical disk 50. FIG. 16 shows the case in which the optical head 140 has access to the DVD 70. FIG. 17 shows the case in which the optical head 140 has access to the CD 80.

In FIG. 15 to FIG. 17, the symbol 105-1 designates an afocal lens corresponding to the afocal lens 105. In the afocal lens 105-1, the wavelength variation correction part 1051 is formed on a surface on the side of the collimating lens 104 of the afocal lens 105-1. In addition, in FIG. 15 to FIG. 17, the symbol 106-1 designates an objective lens corresponding to the objective lens 106. In the objective lens 106-1, instead of the grating pattern 106a as shown in FIG. 1, etc., a grating pattern 106a-1 is formed. The grating pattern 106a-1 is a grating pattern having weaker concave lens action than the grating pattern 106a. The grating pattern 106a-1 may be formed even in the objective lens 106 as shown in FIG. 1, etc.

In addition, the light source 102 is a light source capable of emitting a blue-violet laser beam, red laser beam and infrared laser beam as one package.

The objective lens 106-1 is provided with a diffraction structure that, by utilizing a wavelength difference, the objective lens 106-1 focuses a plus third diffracted light of the blue-violet laser beam onto the information recording surface of the BD 50 having the protective substrate being 0.1 mm thickness, focuses a plus second diffracted light of the red laser beam onto the information recording surface of the DVD 70 having the protective substrate being 0.6 mm thickness, and focuses a plus second diffracted light of the infrared laser beam onto the information recording surface of the CD 80 having the protective surface being 1.2 mm thickness. In addition, the objective lens 106-1 is designed to have a configuration where the WD of the BD 50 is 0.5 mm, the WD of the DVD 70 is 0.4 mm, and the WD of the CD 80 is 0.3 mm.

In addition, it is also possible to adopt the configurations in the second and third embodiments described above to the afocal lens 105-1 and the objective lens 106-1.

Fifth Embodiment

Figure 9:
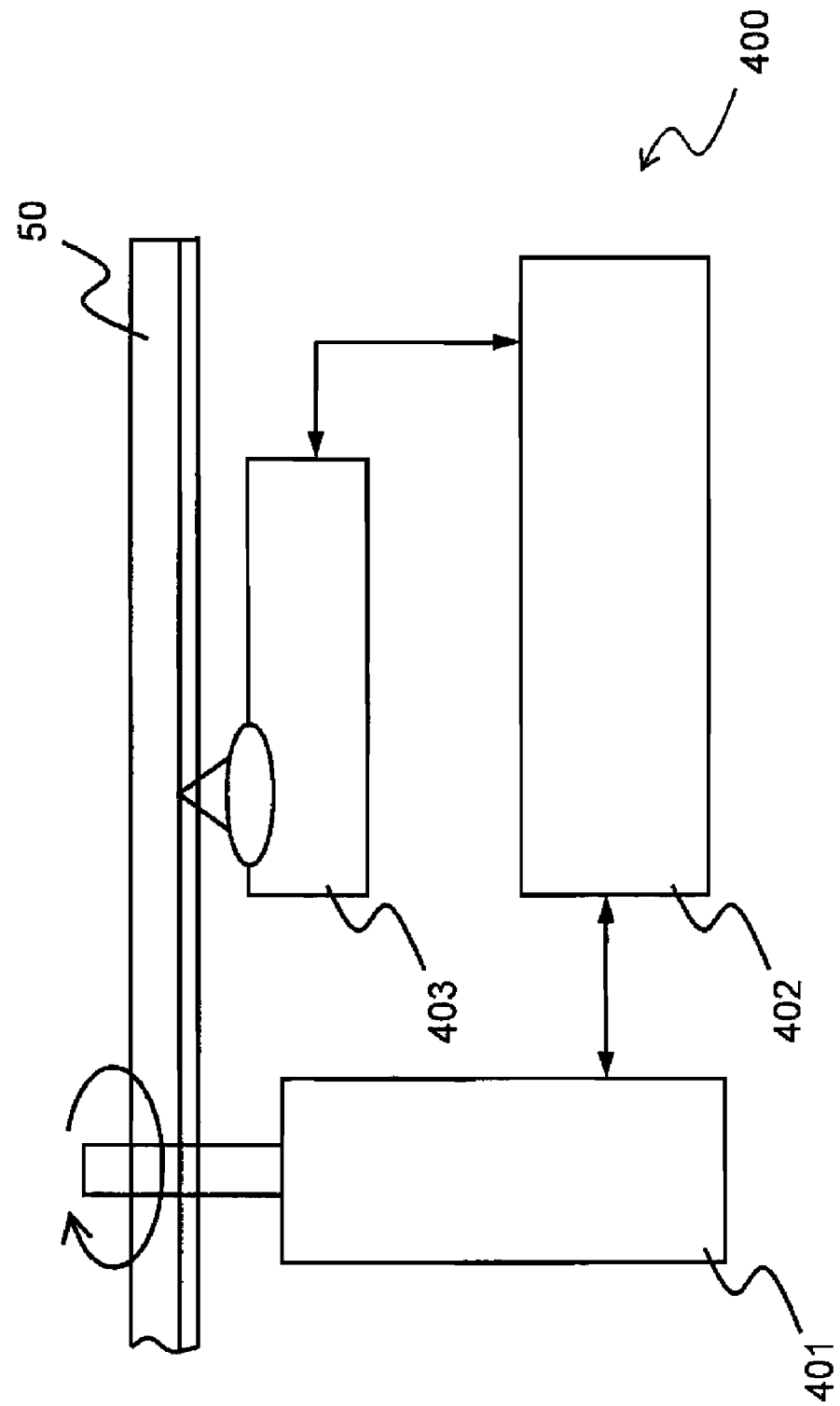
FIG. 9 is a view showing a schematic configuration of the optical disk apparatus in other embodiments of the present invention.

FIG. 9 is a schematic configuration diagram of an optical disk apparatus in one embodiment of the present invention.

In FIG. 9, reference symbol 400 designates an optical disk apparatus that includes an optical disk drive unit 401, a control unit 402, and an optical head 403 therein. In addition, reference symbol 50 designates the first optical disk that can be replaced with the second optical disk 60. Furthermore, the first optical disk 50 is also possible to replace it with the DVD 70 or CD 80.

The optical disk drive unit 401 has the capability of rotating and driving the first optical disk 50 (or the second optical disk 60), and the optical head 403 is any of the optical heads described in the first to fourth embodiments described above. The control unit 402 has the capabilities of not only driving and controlling the optical disk drive unit 401 and the optical head 403, but also processing a control signal and an information signal received by the optical head 403 and interfacing the information signal internally and externally of the optical disk 400.

Since the optical disk apparatus 400 has incorporated any of the optical heads described in the first to fourth embodiments, the optical disk apparatus 400 in the present embodiment can well record and reproduce for a plurality of optical disks.

Sixth Embodiment

Figure 10:
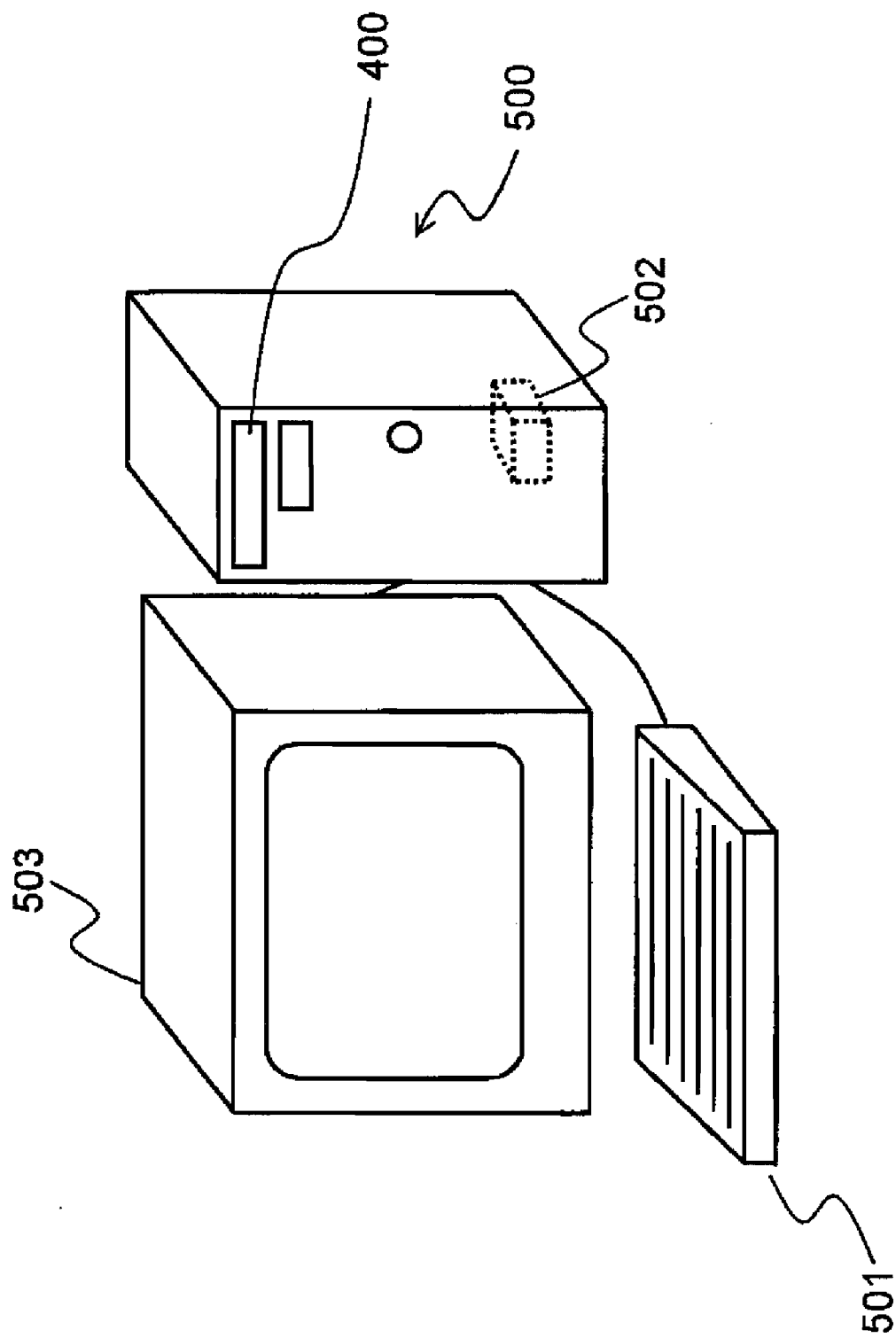
FIG. 10 is a view showing a schematic configuration of a computer in another embodiment of the present invention.

FIG. 10 is a view showing a schematic configuration of a computer as one example of optical information equipment in one embodiment of the present invention.

In FIG. 10, a computer 500 includes the optical disk apparatus 400 of the fifth embodiment, an input unit 501 such as a keyboard or a mouse, a touch panel, etc., for entering information, an arithmetic unit 502 such as a central processing unit (CPU) that carries out operations based on information inputted at the input unit 501 or information read out from the optical disk apparatus, and an output unit 503 such as a cathode-ray tube or a liquid crystal display device, a printer, and the like.

Since the computer 500 includes the optical disk apparatus 400 of the fifth embodiment, and thus can well record and reproduce on different kinds of optical disks respectively, the computer 500 has the effect of being applicable to a wide array of use.

Seventh Embodiment

Figure 11:
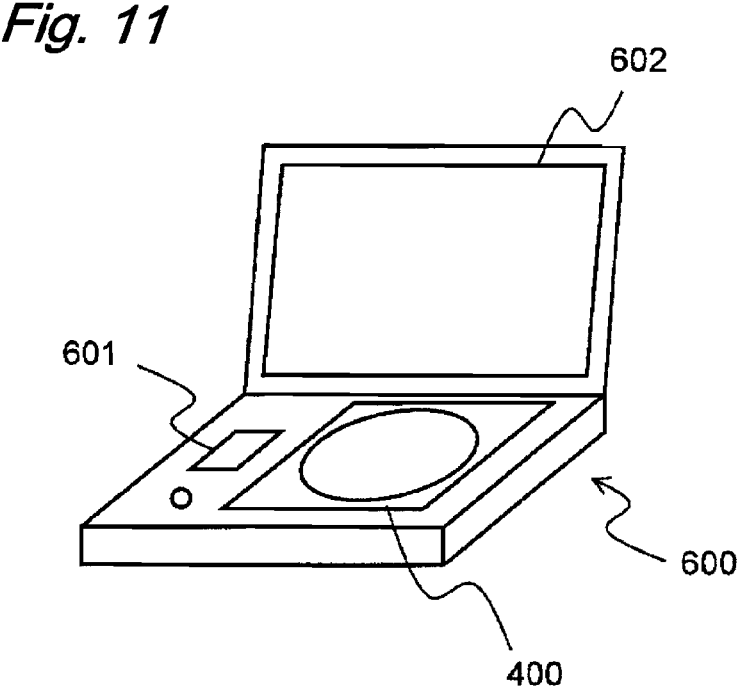
FIG. 11 is a view showing a schematic configuration of an optical disk player in further embodiment of the present invention.

FIG. 11 is a schematic configuration diagram of an optical disk player as one example of the optical information equipment in one embodiment of the present invention.

In FIG. 11, the optical disk player 600 includes the optical disk apparatus 400 of the fifth embodiment and a converter (such as a decoder 601) that converts an information signal to be obtained from the optical disk apparatus 400 into an image signal.

In addition, the optical disk player 600 can also be used as an automobile navigation system by adding a position sensing device such as GPS, etc., or a central processing unit (CPU). The optical disk player 600 can also be in the form in which a display device 602 such as a liquid crystal display monitor is added.

Since the optical disk player 600 includes the optical disk apparatus 400 of the fifth embodiment, and thus can well record or reproduce on different kinds of optical disks, the optical disk player 600 has the effect of being applicable to a wide array of use.

Eighth Embodiment

Figure 12:
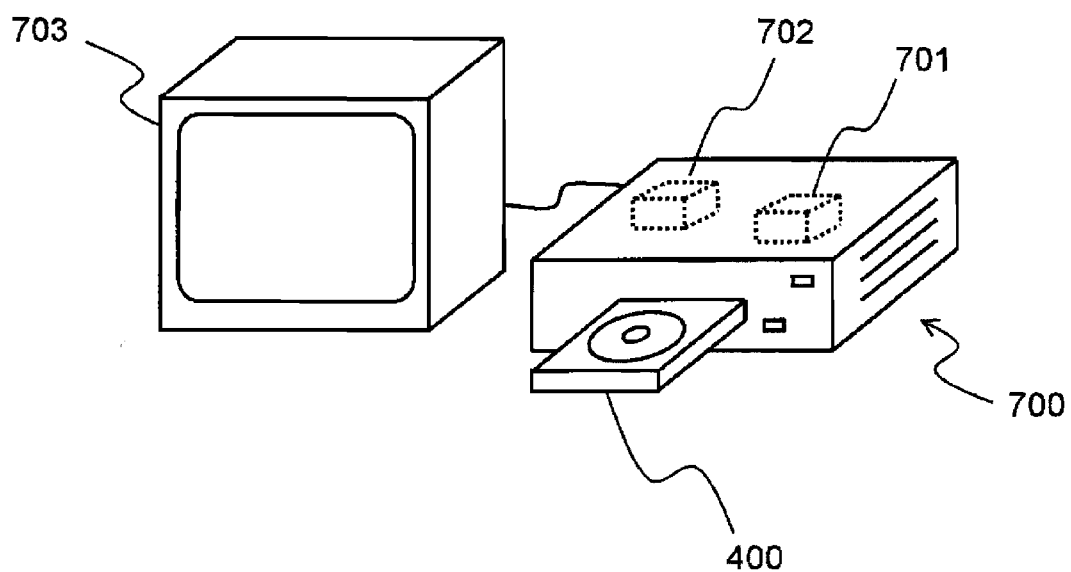
FIG. 12 is a view showing a schematic configuration of an optical disk recorder in further embodiment of the present invention.

FIG. 12 is a schematic configuration diagram of an optical disk recorder as one example of the optical information equipment in one embodiment of the present invention.

In FIG. 12, the optical disk recorder 700 includes the optical disk apparatus 400 of the fifth embodiment, and an image-to-information converter (such as an encoder 701) that converts image information into an information signal to be recorded on an optical disk by the optical disk apparatus 400. It is desirable that provision of an information-to-image converter (such as a decoder 702) that converts an information signal to be obtained from the optical disk apparatus 400 into image information enables recorded images to be reproduced. In addition, the optical disk recorder 700 may also includes a cathode-ray tube or a liquid crystal display device for displaying information or an the output unit 703 such as a printer.

Since the optical disk recorder 700 includes the optical disk apparatus of the fifth embodiment, and thus can well record or reproduce on different kinds of optical disks, the optical disk recorder has the effect of being applicable to a wide array of use.

Ninth Embodiment

In the respective embodiments described above, we described the configuration provided with an afocal lens as configuration that can ensure the WD (working distance), while satisfying the NA (numerical aperture) in an optical head that can be shared on a plurality of optical disks having different protective substrate thickness.

However, as is clearly seen in the above description, the afocal lens in the respective embodiments described above is not limited to an afocal lens for an optical head that can be shared on a plurality of protective substrate thickness, but is usable in any optics systems having an objective lens with the numerical aperture NA being 0.85 or higher. More specifically, in order to achieve the specified WD (working distance) in an objective having high NA such as 0.85 or higher, namely, in order to ensure a focal length, it is necessary to increase a diameter of light flux of light entering the objective lens. Then, as a method of increasing the light flux diameter without increasing the size of optics systems, a method of providing an afocal lens between an objective lens and a collimating lens can be adopted. Then, the expansion ratio of laser beam in the afocal lens is preferably a scale factor satisfying D1×1.1≦D2≦D1×1.5, where D1 is a diameter of light flux of laser beam to be entered into a surface on the side of the collimating lens, and D2 is a diameter of light flux of laser beam to be emitted from a surface on the side of the objective lens.

A combination of any embodiments of the various embodiments described above enables the effect of the respective embodiments to be achieved.

Although the present invention has been fully described with reference to the preferred embodiments, various variations or modifications are obvious to those skilled in the art. Hence, it is to be understood that those variations or modifications are contained therein as far as they do not deviate from the scope of the present invention defined in the attached Claims.

In addition, all of the disclosure of the application, drawings, claims, and abstract of the U.S. Patent Application No. 60/877,604 filed in the United States on Dec. 29, 2006 shall be incorporated herein by reference in its entirety.

What is claimed is:

1. An afocal lens provided in an optical head having a collimating lens and an objective lens, the optical head focusing laser beam emitted from a light source onto information recording surfaces of different kinds of information recording media having different protective substance thickness by different numerical aperture, the afocal lens for the optical head configured to be provided between the collimating lens and the objective lens, expand a diameter of light flux of the laser beam entered from a side of the collimating lens, and emit the entered laser beam as substantially parallel light to the objective lens.

2. The afocal lens for the optical head according to claim 1, wherein the optical head has a light source for emitting laser beam with wavelength of λ1, and the objective lens focuses diffracted light having a plurality of orders being different to each other by the laser beam with wavelength of λ1 on the information recording surfaces on a basis of a kind of the information recording medium.

3. The afocal lens for the optical head according to claim 1, wherein the optical head has a light source that emits laser beam with different wavelengths on a basis of a kind of the information recording medium.

4. The afocal lens for the optical head according to claim 3, wherein the objective lens focuses diffracted light having a plurality of orders being different to each other onto the information recording surfaces on a basis of a kind of the information recording medium.

5. The afocal lens for the optical head according to claim 1, further comprising a wavelength variation correction part configured to correct any aberration generated by wavelength variations in the laser beam, on one of a first surface on the side of the collimating lens and a second surface on the side of the objective lens of the afocal lens.

6. The afocal lens for the optical head according to claim 5, wherein the wavelength variation correction part is formed on the first surface.

7. The afocal lens for the optical head according to claim 5, wherein the wavelength variation correction part is formed on the second surface.

8. The afocal lens for the optical head according to claim 1, further comprising a diffraction part configured to generate diffracted light having n order and m order (n and m are integers being different to each other) and a wavelength variation correction part configured to correct any aberration caused by wavelength variations in the laser beam, on one of a first surface on the side of the collimating lens and a second surface on the side of the objective lens of the afocal lens.

9. The afocal lens for the optical head according to claim 1, further comprising one of a diffraction part configured to generate diffracted light having n order and m order (n and mare integers being different to each other) and a wavelength variation correction part configured to correct any aberration caused by wavelength variations in the laser beam on a first surface, and the other of the diffraction part and the wavelength variation correction part on a second surface, wherein the first surface is a surface located at a side of the collimating lens of the afocal lens and the second surface is a surface located at a side of the objective lens of the afocal lens.

10. The afocal lens for the optical head according to claim 9, wherein the wavelength variation correction part is formed on the first surface and the diffraction part is formed on the second surface.

11. The afocal lens for the optical head according to claim 1, wherein an expansion ratio of laser beam in the afocal lens is a scale factor satisfying:

$$D1 \times 1.1 \leqq D2 \leqq D1 \times 1.5$$

where D1 is a diameter of light flux of laser beam entering into a surface on the side of the collimating lens of the afocal lens, and D2 is a diameter of light flux of laser beam to be emitted from a surface on the side of the objective lens of the afocal lens.

12. The afocal lens for the optical head according to claim 1, wherein the afocal lens is made of resin material and has edge surfaces that are surfaces substantially perpendicular to the light axis of the laser beam on a side of the collimating lens and a side of the objective lens, and an effective surface faced into the objective lens of the afocal lens protrudes with respect to the edge surface on the side of the objective lens.

13. An optical head comprising:
a light source;
a collimating lens; and
an objective lens;
the optical head focusing laser beam emitted from the light source onto information recording surfaces of different kinds of information recording media having different protective substrate thickness by different numerical aperture,
the optical head further comprising a afocal lens configured to be provided between the collimating lens and the objective lens, expand a diameter of light flux of the laser beam entered from the side of the collimating lens, and emit the entered laser beam as substantially parallel light to the objective lens.

14. The optical head according to claim 13, wherein the light source emits the laser beam with wavelength of $\lambda 1$, and the objective lens focuses diffracted light having a plurality of orders being different to each other in the laser beam with wavelength of $\lambda 1$ on the information recording surfaces on a basis of a kind of the information recording medium.

15. The optical head according to claim 13, wherein the light source emits laser beam with different wavelengths on a basis of a kind of the information recording medium.

16. The optical head according to claim 15, wherein the objective lens focuses diffracted light having a plurality of orders being different to each other on the information recording surfaces on the basis of the kind of the information recording medium.

17. The optical head according to claim 13, wherein the objective lens comprises a diffraction part configured to generate diffracted light having n order and m order (n and m are integers being different to each other), and the afocal lens comprises a wavelength variation correction part configured to correct any aberration caused by wavelength variations in the laser beam, on one of a first surface on a side of the collimating lens and a second surface on a side of the objective lens of the afocal lens.

18. The optical head according to claim 17, wherein the wavelength variation correction part is provided on the first surface.

19. The optical head according to claim 13, wherein the afocal lens comprises a diffraction part configured to generate diffracted light having n order and m order (n and m are integers being different to each other) and a wavelength variation correction part configured to correct any aberration caused by wavelength variations in the laser beam, on one of a first surface on a side of the collimating lens and a second surface on a side of the objective lens of the afocal lens.

20. The optical head according to claim 13, wherein the afocal lens comprises one of a diffraction part configured to generate diffracted light having n order and m order (n and m are integers being different to each other) and a wavelength variation correction part configured to correct any aberration caused by wavelength variations in the laser beam on a first surface on a side of the collimating lens of the afocal lens, and comprises the other of the diffraction part and the wavelength variation correction part on a second surface of a side of the objective lens of the afocal lens.

21. The optical head according to claim 20, wherein the diffraction part is provided on the second surface and the wavelength variation correction part is provided on the first surface.

22. The optical head according to claim 13, wherein an expansion ratio of the laser beam in the afocal lens is a scale factor satisfying:

$$D1 \times 1.1 \leq D2 \leq D1 \times 1.5$$

where D1 is a diameter of light flux of the laser beam entering into a surface on a side of the collimating lens of the afocal lens, and D2 is a diameter of light flux of the laser beam to be emitted from a surface on a side of the objective lens of the afocal lens.

23. An optical disk apparatus comprising:
an optical head;
a motor configured to rotate and drive information recording medium; and
a control unit configured to control the optical head and the motor,
the optical head including:
a light source;
a collimating lens; and
an objective lens;
the optical head focusing laser beam emitted from the light source onto information recording surfaces of different kinds of the information recording media having different protective substrate thickness by different numerical aperture,
the optical head further comprising an afocal lens configured to be provided between the collimating lens and the objective lens, expand a diameter of light flux of the laser beam entered from the side of the collimating lens, and emit the entered laser beam as substantially parallel light to the objective lens.

24. Optical information equipment comprising:
an optical disk apparatus; and
an arithmetic unit configured to carry out operations based on information reproduced from the optical disk apparatus,
the optical disk apparatus including:
an optical head;
a motor configured to rotate and drive information recording medium; and
a control unit configured to control the optical head and the motor,
the optical head including:
a light source;
a collimating lens; and
an objective lens;
the optical head focusing laser beam emitted from the light source onto information recording surfaces of different kinds of the information recording media having different protective substrate thickness by different numerical aperture,
the optical head further comprising an afocal lens configured to be provided between the collimating lens and the objective lens, expand a diameter of light flux of the laser beam entered from the side of the collimating lens, and emit the entered laser beam as substantially parallel light to the objective lens.

* * * * *